US012418200B2

(12) United States Patent
Park

(10) Patent No.: US 12,418,200 B2
(45) Date of Patent: Sep. 16, 2025

(54) LIGHT-BASED LOW POWER DEVICE

(71) Applicant: QUALCOMM Incorporated, San Diego, CA (US)

(72) Inventor: Edwin Chongwoo Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 17/815,916

(22) Filed: Jul. 28, 2022

(65) Prior Publication Data

US 2024/0039339 A1 Feb. 1, 2024

(51) Int. Cl.
*H02J 50/30* (2016.01)
*G05B 15/02* (2006.01)
*G06V 20/50* (2022.01)

(52) U.S. Cl.
CPC .............. *H02J 50/30* (2016.02); *G05B 15/02* (2013.01); *G06V 20/50* (2022.01)

(58) Field of Classification Search
CPC .......... H02J 50/30; G06V 20/50; G05B 15/02
See application file for complete search history.

(56) References Cited

U.S. PATENT DOCUMENTS

| | | | | |
|---|---|---|---|---|
| 2011/0089769 | A1* | 4/2011 | Kwon | H02J 50/12 307/104 |
| 2014/0375261 | A1* | 12/2014 | Manova-Elssibony | H02J 7/00034 320/108 |
| 2016/0301258 | A1* | 10/2016 | Zeine | H02J 50/20 |
| 2017/0077736 | A1 | 3/2017 | Leabman | |
| 2018/0019610 | A1* | 1/2018 | Gu | H04B 1/3883 |
| 2018/0248411 | A1 | 8/2018 | Sagi et al. | |
| 2019/0199115 | A1* | 6/2019 | Fang | H02J 50/80 |
| 2020/0303964 | A1* | 9/2020 | Sato | H01L 31/0693 |
| 2021/0075269 | A1* | 3/2021 | Biderman | H04B 10/807 |
| 2021/0119496 | A1* | 4/2021 | Smith | H02J 50/10 |
| 2022/0051537 | A1* | 2/2022 | Dong | B60L 8/003 |
| 2022/0209584 | A1* | 6/2022 | Glover | H02J 50/40 |
| 2022/0216734 | A1* | 7/2022 | Feng | H02J 50/40 |

(Continued)

OTHER PUBLICATIONS

International Search Report and Written Opinion—PCT/US2023/067564—ISA/EPO—Sep. 29, 2023.

*Primary Examiner* — Vincent H Tran
(74) *Attorney, Agent, or Firm* — QUALCOMM Incorporated

(57) ABSTRACT

Systems and techniques are provided for providing power for target devices. For example, a process can include performing, at an environment infrastructure system, a device discovery procedure to discover a target device in an environment; obtaining power requirement information corresponding to the target device; obtaining a distance between a power providing component of the environment infrastructure system and the target device; determining a power amount to transmit to the target device based at least in part on the distance, the power requirement information, and an operation to be performed at the target device; determining a direction from the power providing component to the target device; transmitting the power amount in the direction to provide power to the target device for performing the operation; and receiving an operation result from the target device based on the operation.

28 Claims, 9 Drawing Sheets

(56) References Cited

U.S. PATENT DOCUMENTS

2023/0112408 A1* 4/2023 Rodriguez Bravo ... H02J 50/50
                                                    320/108
2024/0039340 A1* 2/2024 Gu ......................... H02J 50/20

* cited by examiner

LIGHT-BASED LOW POWER DEVICE

FIELD

The present disclosure generally relates to providing power to edge devices. In some examples, aspects of the present disclosure are related to systems and techniques for identifying the location of edge devices, and providing power to the same to perform various operations.

BACKGROUND

An increasing number of scenarios exist in which edge devices may perform tasks (e.g., sensors obtaining data), which produce an output that is obtained for consumption by a separate computing device. Often it is impractical to have wired power to such devices. As such, devices are often powered by other means, such as a battery, which must periodically be changed. Moreover, if such devices are not capable of communicating with other devices, the results of operations performed by the edge devices must be obtained manually, and updates (e.g., software and/or firmware updates, etc.) must be performed manually, at least in part. However, as the quantity of edge devices increases, and the operations that such devices are expected to perform increase in complexity, manual interactions with the devices will become increasingly difficult to perform at scale.

SUMMARY

In some examples, systems and techniques are described for providing offloading services. According to at least one illustrative example, a method of providing power for target devices is provided. The method includes: performing, at an environment infrastructure system, a device discovery procedure to discover a target device in an environment; obtaining power requirement information corresponding to the target device; obtaining a distance between a power providing component of the environment infrastructure system and the target device; determining a power amount to transmit to the target device based at least in part on the distance, the power requirement information, and an operation to be performed at the target device; determining a direction from the power providing component to the target device; transmitting the power amount in the direction to provide power to the target device for performing the operation; and receiving an operation result from the target device based on the operation.

In another example, an environment infrastructure system for providing power to target devices is provided that includes a power providing component, a memory, and a processor coupled to the memory and the power providing component. The processor is configured to: perform a device discovery procedure to discover a target device in an environment; obtain power requirement information corresponding to the target device; obtain a distance between the power providing component and the target device; determine a power amount to transmit to the target device based at least in part on the distance, the power requirement information, and an operation to be performed at the target device; determine a direction from the power providing component to the target device; transmit the power amount in the direction to provide power to the target device for performing the operation; and receive an operation result from the target device based on the operation.

In another example, a non-transitory computer-readable medium is provided that has stored thereon instructions that, when executed by one or more processors, cause the one or more processors to: perform a device discovery procedure to discover a target device in an environment; obtain power requirement information corresponding to the target device; obtain a distance between the power providing component and the target device; determine a power amount to transmit to the target device based at least in part on the distance, the power requirement information, and an operation to be performed at the target device; determine a direction from the power providing component to the target device; transmit the power amount in the direction to provide power to the target device for performing the operation; and receive an operation result from the target device based on the operation.

In another example, an apparatus for providing power for target devices is provided. The apparatus includes: means for performing, at an environment infrastructure system, a device discovery procedure to discover a target device in an environment; means for obtaining power requirement information corresponding to the target device; means for obtaining a distance between a power providing component of the environment infrastructure system and the target device; means for determining a power amount to transmit to the target device based at least in part on the distance, the power requirement information, and an operation to be performed at the target device; means for determining a direction from the power providing component to the target device; means for transmitting the power amount in the direction to provide power to the target device for performing the operation; and means for receiving an operation result from the target device based on the operation.

In some aspects, one or more of the apparatuses described herein is, is part of, and/or includes a mobile or wireless communication device (e.g., a mobile telephone or other mobile device), an extended reality (XR) device or system (e.g., a virtual reality (VR) device, an augmented reality (AR) device, or a mixed reality (MR) device), a wearable device (e.g., a network-connected watch or other wearable device), a vehicle or a computing device or component of a vehicle, a camera, a personal computer, a laptop computer, a server computer or server device (e.g., an edge or cloud-based server, a personal computer acting as a server device, a mobile device such as a mobile phone acting as a server device, an XR device acting as a server device, a vehicle acting as a server device, a network router, or other device acting as a server device), any combination thereof, and/or other type of device. In some aspects, the apparatus(es) include(s) a camera or multiple cameras for capturing one or more images. In some aspects, the apparatus(es) include(s) a display for displaying one or more images, notifications, and/or other displayable data. In some aspects, the apparatus(es) include(s) can include one or more sensors (e.g., one or more inertial measurement units (IMUs), such as one or more gyroscopes, one or more gyrometers, one or more accelerometers, any combination thereof, and/or other sensor.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
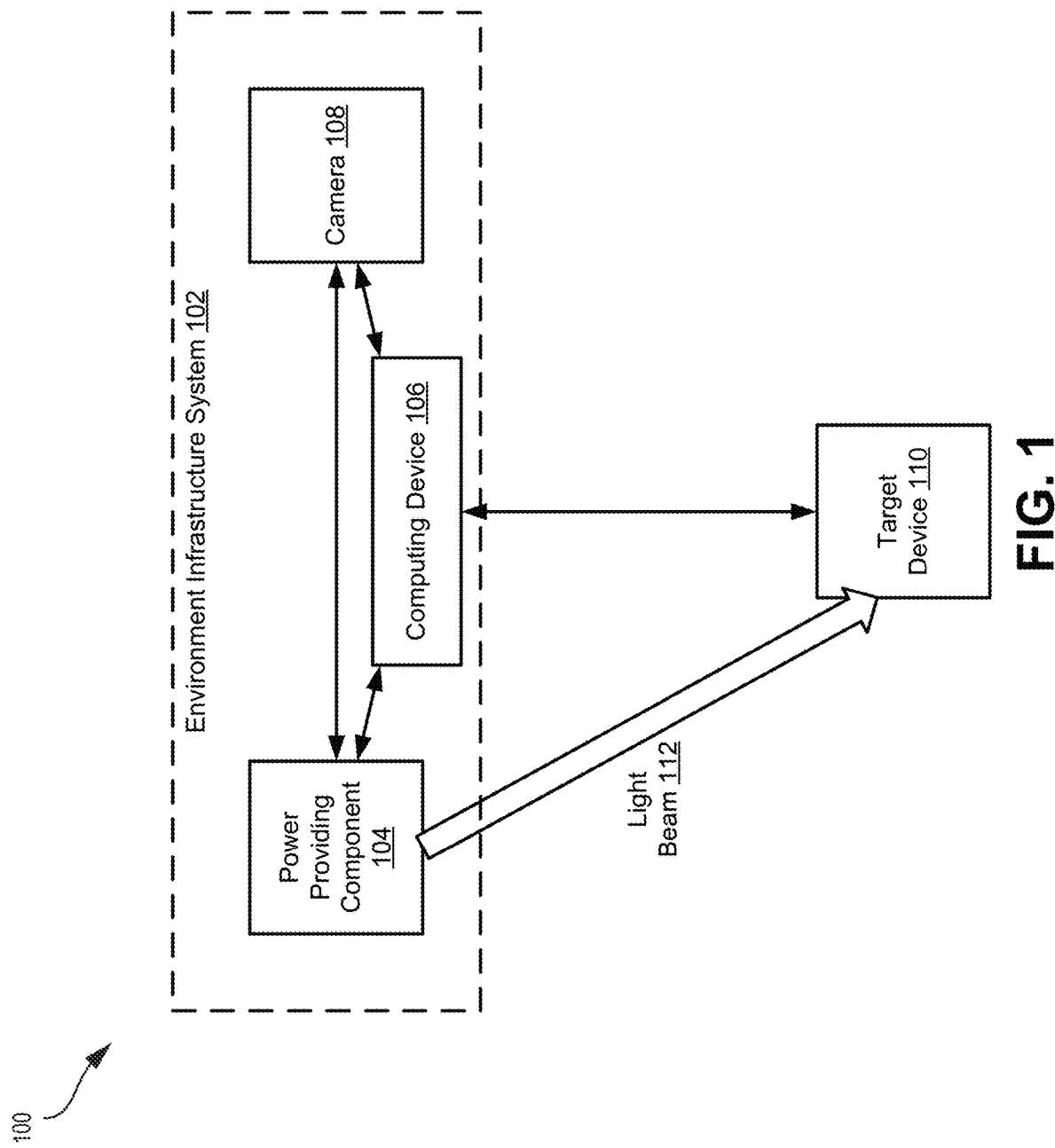
FIG. 1 is a block diagram illustrating a system for providing power to target devices, in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of examples of the application. However, it will be apparent that various examples may be practiced without these specific details. The figures and description are not intended to be restrictive. Additionally, certain details known to those of ordinary skill in the art may be omitted to avoid obscuring the description.

In the below description of the figures, any component described with regard to a figure, in various examples described herein, may be equivalent to one or more like-named components described with regard to any other figure. For brevity, descriptions of these components may not be wholly repeated with regard to each figure. Thus, each and every example of the components of each figure is incorporated by reference and assumed to be optionally present within every other figure having one or more like-named components. Additionally, in accordance with various examples described herein, any description of the components of a figure is to be interpreted as an optional example, which may be implemented in addition to, in conjunction with, or in place of the examples described with regard to a corresponding like-named component in any other figure.

The ensuing description provides exemplary examples only, and is not intended to limit the scope, applicability, or configuration of the disclosure. Rather, the ensuing description of the exemplary examples will provide those skilled in the art with an enabling description for implementing an exemplary example. It should be understood that various changes may be made in the function and arrangement of elements without departing from the spirit and scope of the application as set forth in the appended claims.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection. Additionally, operatively connected devices and/or components may exchange things other than information, such as, for example, electrical current for providing electrical power to at least one of the devices and/or components.

Devices and components designed and configured to perform specific tasks are often deployed at the edge of networks of computing devices. As an example, such devices may be configured to obtain data (e.g., via sensors), which may be processed, at least partially, by the device, or be made available for processing by other devices (e.g., an operatively connected computing device). Such devices require power (e.g., electrical power) to obtain data, perform operations, communicate, etc. However, as the quantity and complexity of such devices (which may be referred to herein as target devices or edge devices) increases, providing power using wired connections becomes increasingly difficult, and providing power via other means, such as batteries, becomes impractical, as batteries must be manually changed, or at least manually recharged, when the battery exhausts its ability to provide sufficient power to the device. Additionally, such devices require power to transmit data (e.g., obtained sensor data, results of locally performed operations, etc.) and receive data (e.g., software updates, firmware updates, machine learning model updates, etc.), otherwise such interactions must also be performed manually. Moreover, manual interactions with large quantities of edge devices requires being aware of exactly where the devices are located at any given time. Accordingly, in order to address the necessity of providing power to, and facilitating communication to and from increasing quantities of edge devices, systems and techniques are needed for identifying the location of such devices, providing power to the identified devices, and communicating with the devices without the need for manual interaction.

Systems, apparatuses, processes (also referred to as methods), and computer-readable media (collectively referred to as "systems and techniques") are described herein for providing power to target devices (e.g., edge devices) using light. In some examples, an environment infrastructure system includes a power providing component. In some examples, the power providing component includes a light source capable of directing a beam of light at a target device. In some examples, the target device includes a power harvesting component (e.g., a photo-voltaic panel) for receiving the light beam, and converting the light into electricity, which may be used to provide power to the device.

In some examples, in order to direct a light beam at a target device in an environment, a device discovery procedure may be performed to locate the target device. A device discovery procedure may be performed by any one or more components of an environment infrastructure system. As an example, the environment infrastructure system may, in addition to the power providing component, include one or more cameras. Such cameras may be able to perceive the environment (e.g., a warehouse), and/or be controlled to perceive portions of the environment. In some examples, images obtained by a camera in the environment may be processed (e.g., by a computing device included in and/or operatively connected to the power providing component and/or the camera) to determine the location of one or more target devices in the environment. Any technique for identifying a target device in an environment using a camera may be used without departing from the scope of examples described herein. As an example, target devices may have a perceivable informative marker (e.g., a Quick Response (QR) code) that may be identified in an image. A perceivable informative marker may convey any type of information to the environment infrastructure system, or any component therein. Examples of such information include, but are not limited to, an identification of the target device (e.g., a serial number, model number, unit number, etc.), information related to the devices intended purpose (e.g., obtain sensor data from one or more sensors, process sensor information, etc.), information related to the power requirements of the target device, etc. As another example of identifying target devices in images, an image obtained by a camera of an environment infrastructure system may be provided to a computing device, which may use the image as input to a trained object detection and identification model (e.g., a machine learning model) that locates and identifies the target device in the image.

In some examples, the device discovery procedure is performed without the use of a camera. As an example, a power providing component of an environment infrastructure system may scan an environment with one or more beams of light. In some examples, when a beam of light reaches a target device, the target device may harvest the light for enough power to communicate information to one or more components of the environment infrastructure system. Such information may include, but is not limited to, an identification of the target device (e.g., a serial number, model number, unit number, etc.), information related to the devices intended purpose (e.g., obtain sensor data from one or more sensors, process sensor information, etc.), information related to the power requirements of the target device, etc. Other techniques for discovering target devices in an environment may be used without departing from the scope of examples described herein. As an example, an environment infrastructure system, or any one or more components therein, may include and/or be operatively connected to one or more data structures that store information about target devices in an environment, including, for example, the existence and location of the one or more target devices. In some examples, the one or more data structures may be accessed, and information therein regarding one or more particular target devices may be obtained as part of a device discovery procedure.

In some examples, after a target device has been identified in an environment, a distance between the target device and one or more power providing components of an environment infrastructure system may be obtained. Any technique for obtaining the distance between a target device and one or more power providing components may be used without departing from the scope of examples described herein. As an example, a data structure included in and/or operatively connected to one or more components of the environment infrastructure system (e.g., a computing device, a power providing component, etc.) may be accessed, and distance information may be obtained therefrom. As another example, one or more images image obtained by one or more cameras of the environment infrastructure may be processed to determine the distance between the target device and one or more power providing components. Examples of processing one or more images to determine the distance may include, but are not limited to: deriving the distance from the target device to the one or more cameras, and combining that information with a known position of the one or more cameras relative to the one or more power providing components in the environment; using one or more images that include both the target device and the one or more power providing components and using a technique (e.g., based on a reference object or distance, known pixel size, etc.) to determine the distance; using the one or more images as input to a trained machine learning model for identifying an object, which allows the size of the object to be known, thereby allowing a distance to be derived; etc.

In some examples, power requirement information for a target device may be obtained. In some examples, power requirement information for a target device includes the amount of power (e.g., ten milliwatts (mW)) that the target device needs to perform one or more operations. Power requirement information for a target device may include any number of separate power amounts, each corresponding to one or more types of operations that a target device may perform (e.g., wake up, transmit information, obtain data, perform calculations, etc.). Any technique for obtaining power requirement information may be used without departing from the scope of examples described herein. As an example, a data structure included in and/or operatively connected to one or more components of the environment infrastructure system (e.g., a computing device, a power providing component, etc.) may be accessed, and power requirement information may be obtained therefrom (e.g., by looking up a device type discovered during a device discovery procedure). As another example, in response to a device discovery procedure, the discovered target device may transmit power requirement information to one or more components (e.g., a computing device, a power providing component, etc.) of an environment infrastructure system. As another example, a perceivable informative marker displayed on the target device may be designed to convey power requirement information (e.g., an image obtained by a camera may be processed to derive the power requirement information from a perceivable informative marker of the target device in the image).

In some examples, once a target device has been located in an environment, a distance between the target device and one or more power providing components has been obtained, and power requirement information for the target device has been obtained (e.g., an amount of power required for the target device to perform one or more particular operations), an amount of power to be transmitted to the target device from one or more power providing components is determined. As an example, when an operation to be performed by the target device is known, the power required for the target device to perform the operation may be ascertained from the power requirement information for the target device. In such a scenario, the power of light beam to be directed at the target device may be calculated based, at least in part, on the distance between the target device and the one or more power providing components, such that the power harvesting component of the target device can convert the light energy into an amount of electrical power sufficient to perform the operation. Different operations may require different amounts of power for different operations. Any light source may be used by a power providing component, and any technique for directing light from such a light source as a beam of light to a target device without departing from the scope of examples described herein. In some examples, a light beam is a group of light rays traveling generally in the same direction (e.g., a straight line), thereby conveying energy by way of photons in the direction that the light beam propagates. The amount of energy conveyed by a light beam may reduce as a function of distance, which is why in may be necessary to obtain the distance from a target device to one or more power providing components in order to determine, at least in part, the necessary power of a light beam to provide a certain amount of power to a target device.

Other considerations may be included in a determination of the amount of power to be projected towards a target device by a power providing component. Such considerations may include, but are not limited to: whether other power providing components will also be providing power to the target device; whether the target device is in a direct line of sight from the power providing component or if the light beam is to be reflected to the target device from another surface; whether the target device is configured with any component (e.g., a Fresnel lens) capable of focusing and/or increasing the amount of power in a received light beam; one or more characteristics of the power harvesting component of the target device (e.g., conversion efficiency); whether the target device has or is receiving light or power from any other source (e.g., ambient light, dedicated light source near the target device; piezoelectric components, etc.) whether the operation to be performed by the target device will require additional operations (e.g., transmitting obtained data back to a component of the environment infrastructure system); whether the target device is configured to provide all or any portion of the power to other target devices; the orientation of the target device relative to a power providing component of the environment infrastructure system; etc.

In some cases, in order to transmit a light beam from a power providing component to a target device to provide power to the target device, a direction between the power providing component and the target device is determined. Any technique may be used to determine the direction between a power providing component and a target device without departing from the scope of examples described herein. As an example, a data structure included in and/or operatively connected to one or more components of the environment infrastructure system (e.g., a computing device, a power providing component, etc.) may be accessed, and a direction may be obtained or derived based on data therein. As another example, one or more images obtained by one or more cameras of an environment infrastructure system may be processed to determine a direction from a power providing component to a target device. As used herein, direction may refer to a direct direction (e.g., a straight line) from a power providing component to a target component, or to a direction that a light beam must be directed to ultimately reach the target device (e.g., when the light beam is to first be reflected off of one or more additional surfaces before reaching the target device).

In some examples, once an amount of power of a light beam to be transmitted from a power providing component to a target device is determined, and a direction from the power providing device to the target device has been determined, a light beam is transmitted towards the target device from the power providing component. In some aspects, the amount of time that the light beam is targeted at the target device is dependent, at least in part, on the amount of power that is intended to be provided to the device, which may, for example, depend at least in part on the conversion efficiency of the one or more power harvesting components of the target device. In some examples, the light energy from the light beam is converted to electrical power by the one or more power harvesting components.

In some cases, as discussed above, the target device includes one of more power harvesting components (e.g., photo-voltaic panels) capable of converting the energy of received light into electrical power to be used by the target device to perform one or more operations (e.g., transmitting information, obtaining data, performing calculations, updating software or firmware, etc.). In some examples, the electrical power is consumed by the target device as it is received. Additionally or alternatively, in some examples, all or any portion of the electrical energy may be stored (e.g., in a battery included in and/or operatively connected to the target device). Receiving power to store in a battery may be considered an example of an operation that a target device may perform in response to receiving light energy from a power providing component. In some examples, a target device is configured to provide power to other target devices. As an example, a particular target device in an environment may be operatively connected to one or more additional target devices that cannot receive power from a power providing component (e.g., because they lack power harvesting components, because they are not in the line of sight from a power providing component, etc.). In such a scenario, the target device that receives power from a power providing component may function as a conduit between the additional one or more target devices and one or more components of the environment infrastructure system. The conduit may be configured to convey power from one or more power providing components to the one or more additional target devices, as well as convey information between (e.g., to and/or from) the one or more additional target devices and one or more components of the environment infrastructure system.

In some examples, the environment infrastructure system, or any one or more components therein, are configured to detect the presence of objects (e.g., one or more people) in the environment and, if detected, to pause the transmission of power to target devices via light beams until such time as the object is no longer in the environment, and/or is not between a power providing component and a target device to which power is being provided via a light beam.

Examples described herein address the need to provide power to target devices, as well as to provide communication to and from the target devices, by providing an environment infrastructure system capable of determining the power requirements of target devices, directing light beams to the target devices to address the power requirements, and communicating with and/or deriving information from target devices. This may eliminate, at least in part, or reduce the need for manual interactions with target devices (e.g., to change batteries, to obtain data, to update software, etc.)

Various aspects of the techniques described herein will be discussed below with respect to the figures. FIG. 1 is a block diagram illustrating an example of an environment 100 that includes an environment infrastructure system 102 and a target device 110. As shown, the environment infrastructure system 102 includes a power providing component 104, a computing device 106, and a camera 108. Each of these components is described below.

In some examples, the environment infrastructure system is any system of one or more components configured to provide power to any number of target devices (e.g., the target device 110) via light beams. In some examples, one component of the environment infrastructure system is the power providing component 104. The power providing component 104 may be any device, component, or any portion thereof that is capable of transmitting light beams towards target devices in the environment 100. In some examples, the power providing component 104 includes and/or is operatively connected to one or more light sources (not shown) (e.g., light bulb, light emitting diode(s), a light pipe, the sun, etc.) of any type that radiate light. In some examples, the power providing component 104 includes a sub-component (not shown) that can direct light radiating from a light source as a light beam (e.g., the light beam 112 shown in FIG. 1). In some examples, the power providing component 104 is configured to direct a beam of light in any direction. The direction in which the power providing component 104 directs a light beam may depend on the location of a target device relative to the power providing component. As used herein, light (e.g., the light in a light beam) may be of any wavelength (e.g., visible, infrared, ultraviolet, etc.). The light beam may be directed using any technique for directing light from a light source without departing from the scope of examples described herein (e.g., reflectors (e.g., mirrors), a mechanical apparatus, electromagnetic fields). In some examples, a light beam from the power providing component 104 may be generated by a laser device. The power providing component 104 may be coupled to a source of power (e.g., electrical outlet, power over Ethernet (POE), etc.), which may power the light source and/or light directing sub-component. Although FIG. 1 shows the environment infrastructure system 102 as having a single power providing component 104, the environment infrastructure system 102 may include any number of power providing components without departing from the scope of examples described herein. Power providing components are discussed further in the description of FIG. 3, below.

In some examples, the environment infrastructure system 102 includes the computing device 106. In some examples, the computing device 106 is any device, portion of a device, or any set of devices capable of electronically processing instructions and may include, but is not limited to, any of the following: one or more processors (e.g. components that include integrated circuitry), memory, input and output device(s), non-volatile storage hardware, one or more physical interfaces, any number of other hardware components, and/or any combination thereof. Examples of computing devices include, but are not limited to, a mobile device (e.g., a laptop computer, smart phone, personal digital assistant, tablet computer, automobile computing system, and/or any other mobile computing device), an Internet of Things (IoT) device, a server (e.g., a blade-server in a blade-server chassis, a rack server in a rack, etc.), a desktop computer, a storage device (e.g., a disk drive array, a fibre channel storage device, an Internet Small Computer Systems Interface (iSCSI) storage device, a tape storage device, a flash storage array, a network attached storage device, etc.), a network device (e.g., switch, router, multi-layer switch, etc.), a wearable device (e.g., a VR headset, an AR headset, AR glasses, a network-connected watch or smartwatch, or other wearable device), a robotic device, a television, and/or any other type of computing device with the aforementioned requirements. In one or more examples, any or all of the aforementioned examples may be combined to create a system of such devices, which may collectively be referred to as a computing device. Other types of computing devices may be used without departing from the scope of examples described herein.

In some examples, the computing device 106 is operatively connected to the power providing component 104. Additionally or alternatively, in some examples, although not shown in FIG. 1, the computing device and the power providing component may be combined as a single device.

In some examples, the computing device 106 is configured to provide compute resources for the environment infrastructure system 102 for performing operations and/or providing functionality of any type. As an example, the computing device 106 may receive data from and/or transmit data to any number of target devices (e.g., target device 110). As another example, the computing device 106 may include and/or be operatively connected to one or more data structures that include information about one or more target devices. Examples of such information may include identifying information for target devices, power requirement information, location information (e.g., including distance and/or direction information between a particular target device and a particular power providing component) within the environment 100, target device capabilities, etc. The computing device 106 may be configured to use an identity of a target device (e.g., serial number, model number, appearance, etc.) to obtain information about the target device from the one or more data structures, and provide such information (e.g., power requirement information) to one or more power providing components (e.g., power providing component 104) of the environment infrastructure system 102.

The computing device 106 may be configured to receive image data from one or more cameras (e.g., the camera 108), and to process the image data to determine various items of information. Examples of such items of information include, but are not limited to, the identity or type of target devices, the location of target devices in the environment 100, the distance from a particular target device to one or more power providing components (e.g., power providing component 104), the direction from one or more power providing components (e.g., power providing component 104) to target devices, etc. The computing device 106 may be configured to calculate the amount of power that the power providing component 104 must transmit to a target device via a light beam in order to allow the target device to perform one or more operations. The computing device 106 may be configured to receive the results of operations performed by target devices (e.g., sensor data, status information, information related to additional target devices, calculation results, machine learning model outputs, etc.), and may also be configured to process the results for any purpose. As an example, an environment infrastructure system and target devices may be deployed in a warehouse, and the target devices may include sensors for monitoring the state of equipment therein. In such a scenario, the target devices may receive power periodically to use sensors to obtain data about the equipment, and to transmit the data to the computing device 106, which processes the sensor data to determine the state of the equipment. Although FIG. 1 shows a single computing device 106, the environment infrastructure system 102 may include any number of computing devices without departing from the scope of examples described herein.

In some examples, the environment infrastructure system 102 include a camera 108. In some examples, a camera is any device capable of optically perceiving and capturing an image (e.g., a two-dimensional representation) of at least a portion of the environment 100. The camera 108 may obtain an image via light in the visible spectrum, or any other portion of the electromagnetic spectrum. The camera 108 may be any type of camera without departing from the scope of examples described herein. Examples of types of cameras include, but are not limited to, video cameras, digital cameras, plate cameras, single lens reflex cameras, mobile device cameras, security cameras, etc. In some examples, the camera 108 is operatively connected to the computing device 106 and/or the power providing component 104. Additionally or alternatively, the camera 108 may be combined with the power providing component 104 and/or the computing device 106. In some examples, the camera 108 is configured to capture images of at least a portion of the environment 100, and to provide or make available data representing the image (e.g., image data) to the computing device 106 and/or the power providing component 104. In some examples, the camera may be capable of being repositioned to capture different portions of the environment via panning, tilting, tracking, etc. In some examples, the camera is configured with a zoom capability. Although FIG. 1 shows the environment infrastructure system 102 as having a single camera 108, the environment infrastructure system 102 may have any number of cameras without departing from the scope of examples described herein.

In some examples, the environment 100 includes a target device 110. A target device may be any device that is capable of receiving power via a light beam (e.g., light beam 112), and using the power to perform operations of any type. The target device 110 may be or include any number of sensors for obtaining data (e.g., sound data, pressure data, image data, temperature data, ambient light data, etc.). In some examples, the target device 110 is or includes a computing device for processing data. For example, the target device 110 may be a computing device with one or more sensors, and be configured to obtain sensor data, and use the sensor data as input to a trained machine learning model to produce a result, which may be transmitted to the computing device 106 for further processing or other use. In some examples, the target device 110 is operatively connected to the computing device 106. Although FIG. 1 shows the environment 100 as having a single target device 110, the environment 100 may have any number of target devices without departing from the scope of examples described herein. Target devices are discussed in greater detail in the description of FIG. 2, below.

While FIG. 1 shows a certain number of components in a particular configuration, one of ordinary skill in the art will appreciate that the environment 100 may include more components or fewer components, and/or components arranged in any number of alternate configurations without departing from the scope of examples described herein. As an example, there may be any number of power providing components, computing devices, cameras, and/or target devices. As another example, the environment infrastructure system may include no cameras, if other techniques are to be employed for a device discovery procedure. Accordingly, examples disclosed herein should not be limited to the configuration of components shown in FIG. 1. Additional non-limiting examples of environment configurations are discussed below in the descriptions of FIG. 4, FIG. 5, and FIG. 6.

Figure 2:
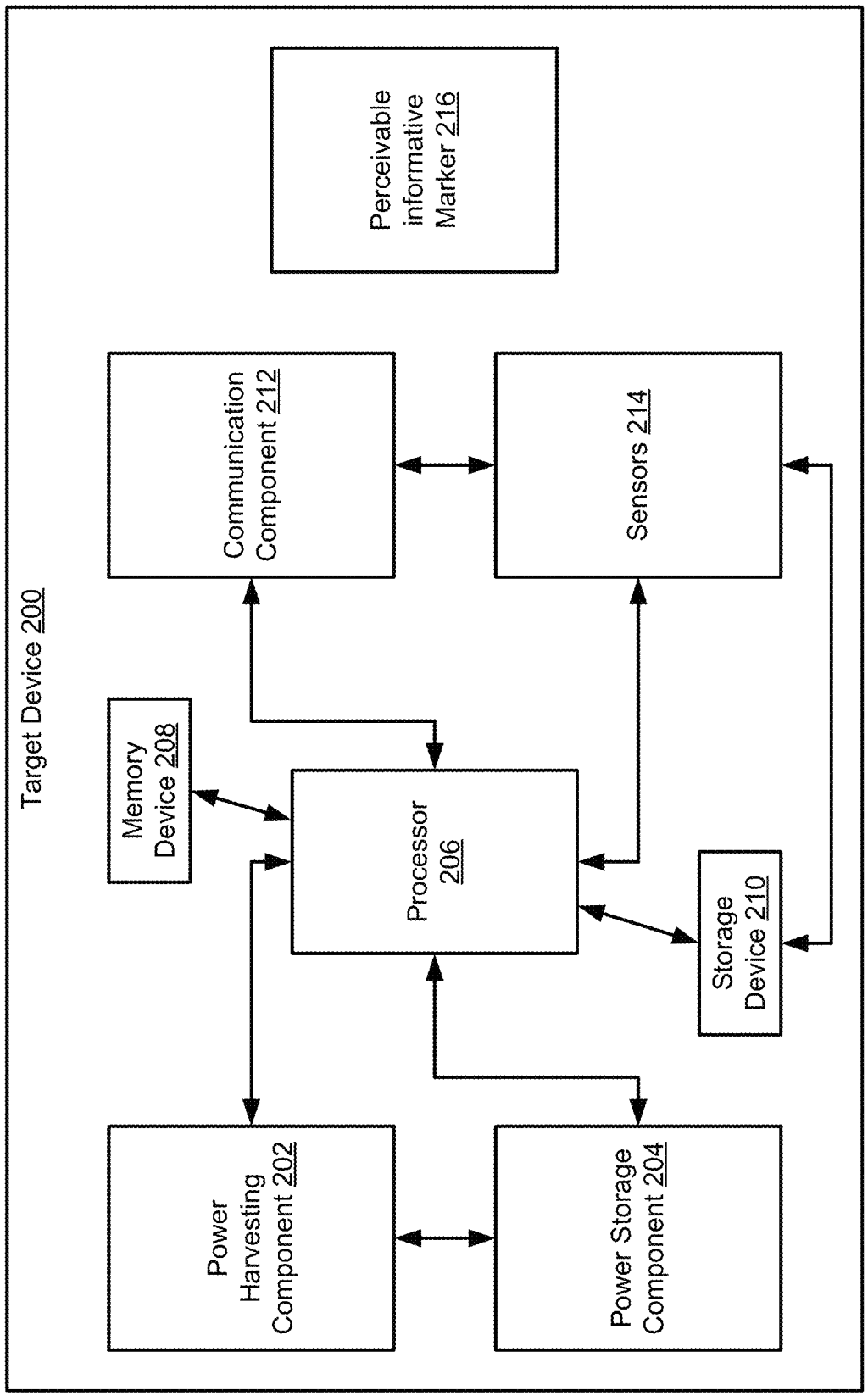
FIG. 2 is a block diagram illustrating a target device, in accordance with some examples.

FIG. 2 is a block diagram of an example target device 200 in accordance with one or more examples described herein. In some examples, the target device 200 is the same as the target device 110 shown in FIG. 1 and described above. As shown in FIG. 2, the target device 200 includes a power harvesting component 202, a power storage component 204, a processor 206, a memory device 208, a storage device 210, a communication component 212, sensors 214, and a perceivable informative marker 216. Each of these component is described below.

In some examples, as discussed above in the description of FIG. 1, the target device 200 is any device that is capable of receiving power via a light beam (e.g., light beam 112 shown in FIG. 1), and using the power to perform operations of any type. The target device may be configured to obtain data (e.g., using the sensors 214), process data (e.g., using the processor 206, the memory device 208, and/or the storage device 210), transmit data to and/or receive data from other devices (e.g., via the communication component 212), perform any other type of operation, and/or perform any combination of such operations. In some examples, the target device is a low power device deployed in an environment and configured to perform one or more tasks. Such tasks may be performed continuously, periodically, on-demand, etc. Examples of tasks may include, but are not limited to, obtaining data about the environment and/or devices, objects, etc. therein, perform pre-processing or processing of obtained data, execute trained machine learning algorithms, transmit data, transmit operation results, transmit identifying information, transmit information related to power requirements, receive updates (e.g., software updates, firmware updates, machine learning algorithm updates, etc.), install updates, communicate with other target devices, etc. As an example, a variety of target devices, including target device 200, may be deployed in a warehouse environment, and be used for a variety of tasks, such as, for example: product tracking, equipment monitoring, predictive failure, safe product handling, inventory management, etc. In some examples, the target device 200 is a computing device (see description of computing device 106 in the description of FIG. 1, above). In some examples, the target device 200 obtains data (e.g., via the sensors 214), processes the data, and transmits the results of the processing (e.g., to a separate computing device). In other examples, the target device 200 obtains data, and transmits the raw data. In still other examples, the target device 200 shares the processing of data with one or more other devices. For example, the target device may obtain raw sensor data from one or more sensors, pre-process the data to put the data in a particular form, and then transmit the data to a separate computing device, which further processes the pre-processed data. The target device 200 may be a separate device in an environment, or may be integrated into one or more other devices in the environment.

In some examples, the target device 200 includes a power harvesting component 202. The power harvesting component 202 may be any component capable of receiving energy via light, and converting the energy into electricity. One example of a power harvesting component is a photo-voltaic panel. Any other type of power harvesting component may be used without departing from the scope of examples described herein. Although FIG. 2 shows a single power harvesting component 202, the target device 200 may include any number of power harvesting components. The power harvesting components may be placed on different sides of and/or locations on the target device 200. The power harvesting component 202, and any other power harvesting component of the target device 200, may be configured to harvest power from any light source, such as one or more power providing components of an environment infrastructure system, ambient light sources in an environment, dedicated light sources shining light on the target device 200, sunlight, etc. Although not shown in FIG. 2, the target device 200 may include one or more concentrators (e.g., Fresnel lenses), which may increase the power provided to the target device 200 may concentrating light on the power harvesting component, or portions thereof.

In some examples, the power harvesting component 202 provides electricity to the various other components of the target device. Although not shown in FIG. 2, the power harvesting component 202 may be operatively connected to all or any portion of the other components of the target device 200. In some examples, the electricity provided by the power harvesting device is used immediately.

Additionally or alternatively, the electricity may be stored for future use. In some examples, electricity is stored on a power storage component 204 operatively connected to the power harvesting component 202. The power storage component 204 may be any component capable of receiving and storing electrical power, and of providing the electrical power to other components of the target device 200, as needed. The power storage component 204 may store any amount of power without departing from the scope of examples described herein. As an example, the power storage component 204 may include one or more batteries of any type (e.g., lithium-ion, alkaline, aluminum-air, nickel-cadmium, solid-state, etc.), capacitors, one or more thermal energy storage components, etc. In some examples, the power storage component includes one or more batteries that may be charged and/or recharged using electricity provided by the power harvesting component 202. Although FIG. 2 shows the target device 200 as having a single power storage component 204, the target device 200 may have any number of power storage components without departing from the scope of examples described herein.

In some examples, the power harvesting component 202 and the power storage component 204 are each operatively connected to the processor 206. In some examples, the processor 206 is any component that includes circuitry for executing instructions (e.g., of a computer program). As an example, such circuitry may be integrated circuitry implemented, at least in part, using transistors implementing such components as arithmetic logic units, control units, logic gates, registers, etc. In some examples, the processor may include additional components, such as, for example, cache memory. In some examples, a processor retrieves and decodes instructions, which are then executed. Execution of instructions may include operating on data, which may include reading and/or writing data. In some examples, the instructions and data used by a processor are stored in the memory (e.g., memory device 208) of the target device 200. A processor may perform various operations for executing software, such as operating systems, applications, etc. The processor 206 may cause data to be written from memory to storage of the target device 200 and/or cause data to be read from storage via the memory. Examples of processors include, but are not limited to, central processing units (CPUs), graphics processing units (GPUs), neural processing units, tensor processing units, data processing units (DPUs), digital signal processors (DSPs), etc. The processor 206 may be operatively connected to the memory device 208, and any storage (e.g., the storage device 210) of the target device 200. Although FIG. 1 shows the target device 200 having one processor 206, the target device 200 may have any number of processors without departing from the scope of examples described herein.

In some examples, the target device 200 includes a storage device 210. In some examples, the storage device 210 is a non-volatile data storage device. The storage device 210 may, for example, be a persistent memory device. In some examples, the storage device 210 may be computer storage of any type. Examples of type of computer storage include, but are not limited to, hard disk drives, solid state drives, flash storage, tape drives, removable disk drives, Universal Serial Bus (USB) storage devices, secure digital (SD) cards, optical storage devices, read-only memory devices, etc. Although FIG. 1 shows the storage device 210 as part of the target device 200, the storage device 210 may be separate from and operatively connected to the target device 200 (e.g., an external drive array, cloud storage, etc.). In some examples, the storage device 210 is operatively connected to the processor 206. Although FIG. 1 shows the target device 200 having a single storage device 210, the target device 200 may have any number of storage devices without departing from the scope of examples described herein.

In some examples, the target device 200 includes a memory device 208. The memory device 208 may be any type of computer memory. In some examples, the memory device 208 is a volatile storage device. As an example, the memory device 208 may be random access memory (RAM). In one or more examples, data stored in the memory device 208 is located at memory addresses, and is thus accessible to the processor 206 using the memory addresses. Similarly, the processor 206 may write data to the memory device 208 using the memory addresses. The memory device 208 may be used to store any type of data, such as, for example, computer programs, the results of computations, sensor data, etc. In some examples, the memory device 208 is operatively connected to the processor 206. Although FIG. 2 shows the target device 200 having a single memory device 208, the target device 200 may have any number of memory devices without departing from the scope of examples described herein.

In some examples, the target device 200 includes one or more sensors 214. A sensor may be any device capable of obtaining data of any type about an environment or anything in the environment. Examples of sensors include, but are not limited to, sound sensors, pressure sensors, image capture devices, temperature sensors, radio detection and ranging (RADAR) devices, light detection and ranging (LIDAR) devices, motion sensors, location tracking devices, collision detection devices, proximity sensors, accelerometers, gyroscopes, infrared sensors, ultrasonic sensors, smoke detectors, gas detectors, touch sensors, color sensors, humidity sensors, precipitation sensors, fluid flow sensors, magnetic sensors, tilt sensors, strain and weight sensors, etc. The target device 200 may have any number of sensors of a single type, or any combination of types. In some examples, the sensors 214 are operatively connected to the processor 206 and/or to the storage device 210. In some examples, data from one or more sensors 214 is stored in the storage device 210. In some examples, data from one or more sensors 214 are processed by the processor 206 to obtain a result. When the target device 200 uses one or more sensors to obtain data, or to process such data, different power requirements may exist to perform the sensing and/or processing, which may require receiving differing amounts of power from one or more power providing components. The sensors 214 may be used to obtain data at scheduled times, upon request (e.g., from a component of the environment infrastructure system 102 of FIG. 1), in response to events occurring (e.g., event driven sensing), and/or any combination thereof.

In some examples, the target device 200 includes the communication component 212. The communication component 212 may be any component capable of transmitting and/or receiving data wirelessly. Examples of communication components include, but are not limited to, wireless transceivers, modems, and/or other components implementing any type of wireless communication technology. Such types of wireless communication technology include, but are not limited to, radio frequency communication, cellular network communication, Bluetooth communication, infrared communication, satellite communication, microwave communication, visible light communication (e.g., Li-Fi), wireless network communication (e.g., Wi-Fi), ultrasonic communication, etc. Although FIG. 2 shows the target device 200 having a single communication component 212, the target device 200 may have any number of communication components without departing from the scope of examples therein, and such communication components may use a single wireless communication technology or a mix of any number of different wireless communication technologies. In some examples, the communication component 212 is operatively connected to the processor 206 and/or to the sensors 214. In some examples, the communication component 212 is configured to transmit data (e.g., sensor data, results of operations, processed data, etc.) to and/or receive data from one or more components of an environment infrastructure system (e.g., the environment infrastructure system 102 of FIG. 1), such as, for example, one or more power providing components, one or more computing devices, etc. Additionally or alternatively, the communication component 212 may be configured to communicate with other devices or components in an environment (e.g., environment 100 of FIG. 1), such as, for example, other target devices (discussed further in the description of FIG. 5, below).

In some examples, the target device 200 includes a perceivable informative marker 216. In some examples, a perceivable informative marker is any perceivable marker that can convey information of any type to any entity that perceives the marker (e.g., the camera 108 of the environment infrastructure system 102 of FIG. 1). Examples of perceivable informative markers include, but are not limited to, Quick Response (QR) codes, ultra-violet markers, infrared range images, LIDAR reflective patches, sonic/ultrasonic markers, electromagnetic tags, bar codes, alpha-numerical markers, near field communication tags, images (e.g., displayed on a screen, E-paper, etc.), Bluetooth beacons, Aztec codes, website link, portable data file 417 (PDF417) code, etc. Examples of information that may be conveyed by the perceivable informative marker 216 include, but are not limited to: information identifying the target device 200; information related to the power requirements or other characteristics of the target device 200; status information; requests for power to perform operations; etc. As an example, the perceivable informative marker 216 may be a QR code that is perceived by a camera (e.g., camera 108 of FIG. 1), and used to discover the target device 200 in an environment (e.g., environment 100 of FIG. 1). As another example, the perceivable informative marker 216 may be a QR code of a known size, which, when perceived by one or more cameras of an environment infrastructure system (e.g., environment infrastructure system 102 of FIG. 1), allows for the distance between the target device 200 and one or more power providing components to be obtained. As another example, the perceivable informative marker 216 may convey information identifying the target device 200 (e.g., serial number, model number, device type, etc.), which may be used by one or more components of an environment infrastructure system to perform a lookup in a data structure that includes additional information about the target device (e.g., power requirement information).

Although not shown in FIG. 2, the perceivable informative marker 216 may be operatively connected to other components of the target device 200. As an example, the perceivable informative marker 216 may be a screen for displaying information that may change from time to time, and the perceivable informative marker 216 may be operatively connected to the processor, which directs updates of the information shown on the screen. In some examples, the information displayed by the perceivable informative marker 216 is static. Additionally or alternatively, the information displayed by the perceivable informative marker 216 may sometimes change. Although FIG. 2 shows the target device 200 as having a single perceivable informative marker 216, the target device 200 may have any number of perceivable informative markers without departing from the scope of examples described herein. Such perceivable informative markers may each display the same information, or may display different information.

While FIG. 2 shows a certain number of components in a particular configuration, one of ordinary skill in the art will appreciate that the target device 200 may include more components or fewer components, combinations of one or more components into a single component, certain components implemented as two or more components, and/or components arranged in any number of alternate configurations without departing from the scope of examples described herein. As an example, the target device 200 may not have a processor, a memory device, a storage device, for other components. As another example, the target device 200 may not include a perceivable informative marker. As another example, for any component of the target device 200 shown in FIG. 2, the target device may include any number of such components. Additionally, although not shown in FIG. 1, one of ordinary skill in the art will appreciate that the target device 200 may, when powered on, execute any amount or type of software or firmware (e.g., bootloaders, operating systems, hypervisors, virtual machines, computer applications, mobile device apps, etc.). Accordingly, examples disclosed herein should not be limited to the configuration of components shown in FIG. 2.

Figure 3:
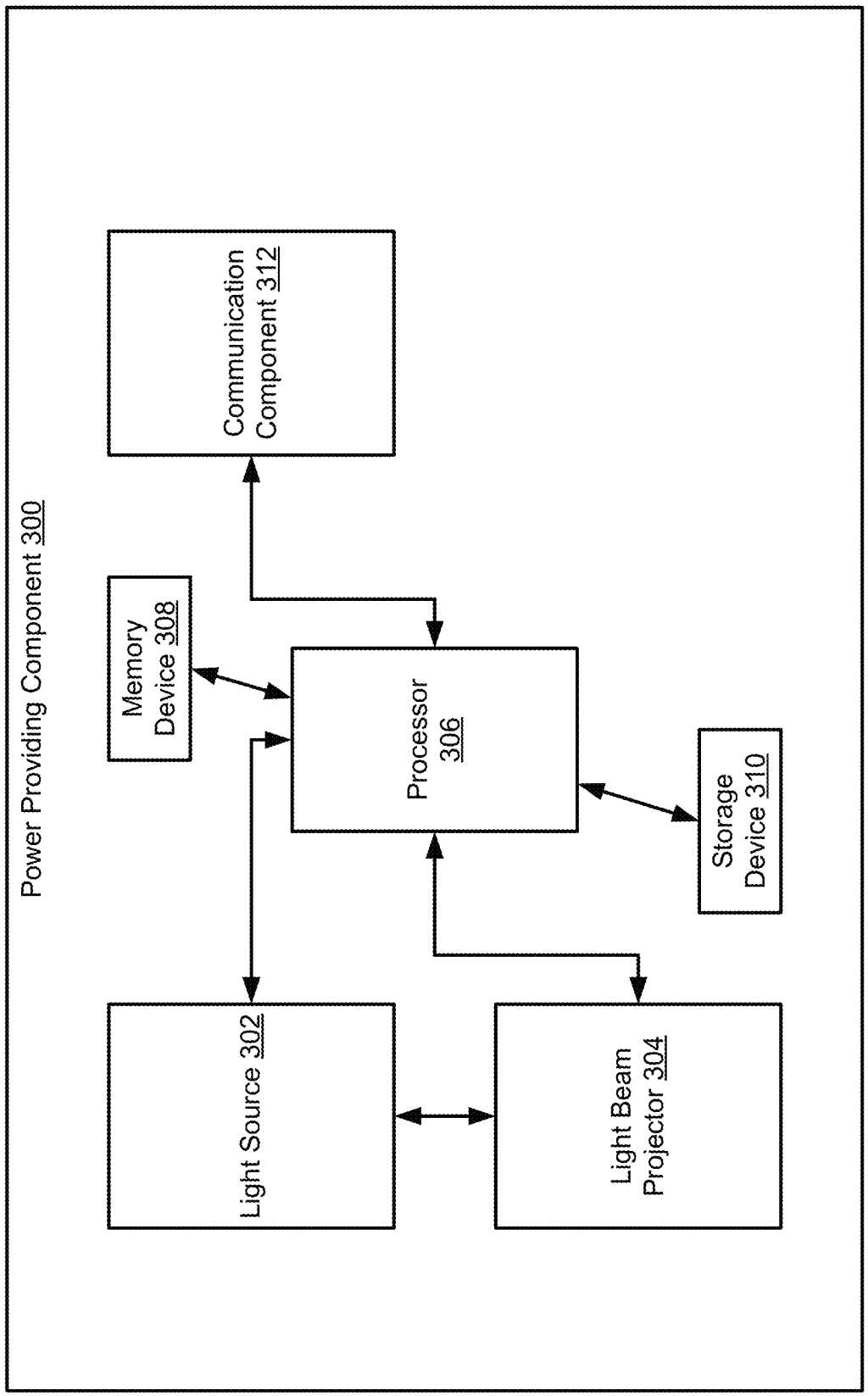
FIG. 3 is a block diagram illustrating a power providing component, in accordance with some examples.

FIG. 3 is a block diagram of a power providing component 300 in accordance with one or more examples described herein. In some examples, the power providing component 300 is the same as the power providing component 104 shown in FIG. 1 and described above. As shown in in FIG. 3, the power providing component 300 includes a light source 302, a light beam projector 304, a processor 306, a memory device 308, a storage device 310, and a communication component 312. Each of these components is described below.

As discussed above in the description of FIG. 1, the power providing component 300 is a component of any type that is capable of directing beams of light towards target devices (e.g., the target device 110 of FIG. 1, the target device 200 of FIG. 2) in order to provide power to the target device. As such, the power providing component 300 may include the light source 302. In some examples, the light source 302 is any source of light. Examples of a light source include, but are not limited to, a light bulb or lamps of any type, LEDs, lasers, light pipes, the sun, etc. Although FIG. 3 shows the power providing component as having a single light source 302, the power providing component may have any number of light sources without departing from the scope of examples described herein. Additionally, although FIG. 3 shows the light source 302 as part of the power providing component 300, the light source 302 may additionally or alternatively be separate from and operatively connected to the power providing component 300.

In some examples, the power providing component 300 includes a light beam projector 304. The light beam projector 304 may be any component capable of directing light radiating from a light source as a light beam (e.g., the light beam 112 shown in FIG. 1). The light beam projector 304 may direct light beams in any direction. The direction in which the power providing component 104 directs a light beam may depend on the location of a target device relative to the power providing component. As used herein, light (e.g., the light in a light beam) may be of any wavelength (e.g., visible, infrared, ultraviolet, etc.). The amount of energy transmitted via the light beam may depend on a power amount determined as needed to provide a certain amount of power to a target device. As an example, after a target device is discovered and located in an environment, a distance from the power providing component to the target device may be determined. The distance and a power requirement for the target device to perform one or more particular operations may be used to determine the energy to be transmitted via the light beam, as the light beam may lose energy as it propagates over the distance to the target device. Therefore, the energy in the light beam at the light beam projector may be greater than the energy received at the target device to account for any lost energy as the light beam travels the distance to the target device. The light beam may be directed using any technique for directing light from a light source without departing from the scope of examples described herein (e.g., reflectors (e.g., micro-electromechanical systems (MEMS) mirrors), a mechanical apparatus, electromagnetic fields, a laser device, etc.).

In some examples, the light beam projector 304 is capable of providing differing amounts of power at different times. As an example, target devices may require different amounts of power for different operations. As another example, various target devices in an environment may be different distances from the power providing component 300. In some examples, the direction of a light beam transmitted by the light beam projector 304 is controllable. As an example, the direction of the light beam may be controlled to be in the direction of a target device. As another example, the light beam projector 304 may be used during a device discovery process to scan the environment to discover target devices, which may, for example, provide a response (e.g., indicating the presence of the target device) when the light beam encounters the target device.

In some examples, the target device may not be in a direct line of sight from the light beam projector 304. In such scenarios, the light beam may be transmitted by the light beam projector 304 in a direction other than directly at the target device. As an example, a series of one or more light reflecting surfaces (e.g., mirrors) may be used to change the direction of the light beam to allow the light beam to reach the target device. In some examples, the light beam projector 304 is operatively connected to the light source 302. Additionally or alternatively, although not shown in FIG. 3, the light source 302 and the light beam projector 304 may be combined into a single component (e.g., a laser device). Although FIG. 3 shows the power providing component 300 as having a single light beam projector 304, the power providing component 300 may include any number of light beam projectors without departing from the scope of examples herein, and the various light beam projectors may be used to provide power to any number of target devices in an environment.

The light source 302 and the light beam projector 304 may each be operatively connected to the processor 306. In some examples, the processor 306 is any component that includes circuitry for executing instructions (e.g., of a computer program). As an example, such circuitry may be integrated circuitry implemented, at least in part, using transistors implementing such components as arithmetic logic units, control units, logic gates, registers, etc. In some examples, the processor may include additional components, such as, for example, cache memory. In some examples, a processor retrieves and decodes instructions, which are then executed. Execution of instructions may include operating on data, which may include reading and/or writing data. In some examples, the instructions and data used by a processor are stored in the memory (e.g., memory device 308) of the power providing component 300. A processor may perform various operations for executing software, such as operating systems, applications, etc. The processor 306 may cause data to be written from memory to storage of the power providing component 300 and/or cause data to be read from storage via the memory. Examples of processors include, but are not limited to, central processing units (CPUs), graphics processing units (GPUs), neural processing units, tensor processing units, data processing units (DPUs), digital signal processors (DSPs), etc. The processor 306 may be operatively connected to the memory device 308, and any storage (e.g., the storage device 310) of the power providing component 300. Although FIG. 1 shows the power providing component 300 having one processor 306, the power providing component 300 may have any number of processors without departing from the scope of examples described herein. Additionally or alternatively, although FIG. 3 shows the power providing component 300 as including a processor 306, in some examples, the processor 306 may instead be part of a computing device of which the power providing component 300 is a sub-component and/or to which the power providing component 300 is operatively connected within an environment infrastructure system (e.g., environment infrastructure system shown in FIG. 1 and described above).

In some examples, the power providing component 300 includes a storage device 310. In some examples, the storage device 310 is a non-volatile data storage device. The storage device 310 may, for example, be a persistent memory device. In some examples, the storage device 310 may be computer storage of any type. Examples of type of computer storage include, but are not limited to, hard disk drives, solid state drives, flash storage, tape drives, removable disk drives, Universal Serial Bus (USB) storage devices, secure digital (SD) cards, optical storage devices, read-only memory devices, etc. Although FIG. 3 shows the storage device 310 as part of the power providing component 300, the storage device 310 may be separate from and operatively connected to the power providing component 300 (e.g., an external drive array, cloud storage, etc.). In some examples, the storage device 310 is operatively connected to the processor 306. Although FIG. 1 shows the power providing component 300 having a single storage device 310, the power providing component 300 may have any number of storage devices without departing from the scope of examples described herein. Additionally or alternatively, although FIG. 3 shows the power providing component 300 as including the storage device 310, in some examples, the storage device 310 may instead be part of a computing device of which the power providing component 300 is a sub-component and/or to which the power providing component 300 is operatively connected within an environment infrastructure system (e.g., environment infrastructure system shown in FIG. 1 and described above).

In some examples, the power providing component 300 includes a memory device 308. The memory device 308 may be any type of computer memory. In some examples, the memory device 308 is a volatile storage device. As an example, the memory device 308 may be random access memory (RAM). In one or more examples, data stored in the memory device 308 is located at memory addresses, and is thus accessible to the processor 306 using the memory addresses. Similarly, the processor 306 may write data to the memory device 308 using the memory addresses. The memory device 308 may be used to store any type of data, such as, for example, computer programs, the results of computations, power requirement data for target devices, etc. In some examples, the memory device 308 is operatively connected to the processor 306. Although FIG. 1 shows the power providing component 300 having a single memory device 308, the power providing component 300 may have any number of memory devices without departing from the scope of examples described herein. Additionally or alternatively, although FIG. 3 shows the power providing component 300 as including the memory device 308, in some examples, the storage device 310 may instead be part of a computing device of which the power providing component 300 is a sub-component and/or to which the power providing component 300 is operatively connected within an environment infrastructure system (e.g., environment infrastructure system shown in FIG. 1 and described above).

In some examples, the power providing component 300 includes the communication component 312. The communication component 312 may be any component capable of transmitting and/or receiving data wirelessly. Examples of communication components include, but are not limited to, wireless transceivers, modems, and/or other components implementing any type of wireless communication technology. Such types of wireless communication technology include, but are not limited to, radio frequency communication, cellular network communication, Bluetooth communication, infrared communication, satellite communication, microwave communication, visible light communication (e.g., Li-Fi), wireless network communication (e.g., Wi-Fi), ultrasonic communication, etc. Although FIG. 3 shows the power providing component 300 having a single communication component 312, the power providing component 300 may have any number of communication components without departing from the scope of examples therein, and such communication components may use a single wireless communication technology or a mix of any number of different wireless communication technologies. In some examples, the communication component 312 is operatively connected to the processor 306. In some examples, the communication component 312 is configured to transmit data to and/or receive data (e.g., sensor data, results of operations, processed data, power requirement information related to target devices, etc.) from one or more other components of an environment infrastructure system (e.g., the environment infrastructure system 102 of FIG. 1), such as, for example, one or more other power providing components, one or more computing devices, etc. Additionally or alternatively, the communication component 312 may be configured to communicate with any number of target devices in an environment (e.g., environment 100 of FIG. 1).

While FIG. 3 shows a certain number of components in a particular configuration, one of ordinary skill in the art will appreciate that the power providing component may include more components or fewer components, combinations of one or more components into a single component, certain components implemented as two or more components, and/or components arranged in any number of alternate configurations without departing from the scope of examples described herein. Additionally, although not shown in FIG. 3, one of ordinary skill in the art will appreciate that the target device 200 may, when powered on, execute any amount or type of software or firmware (e.g., bootloaders, operating systems, hypervisors, virtual machines, computer applications, mobile device apps, etc.). Accordingly, examples disclosed herein should not be limited to the configuration of components shown in FIG. 3.

Figure 4:
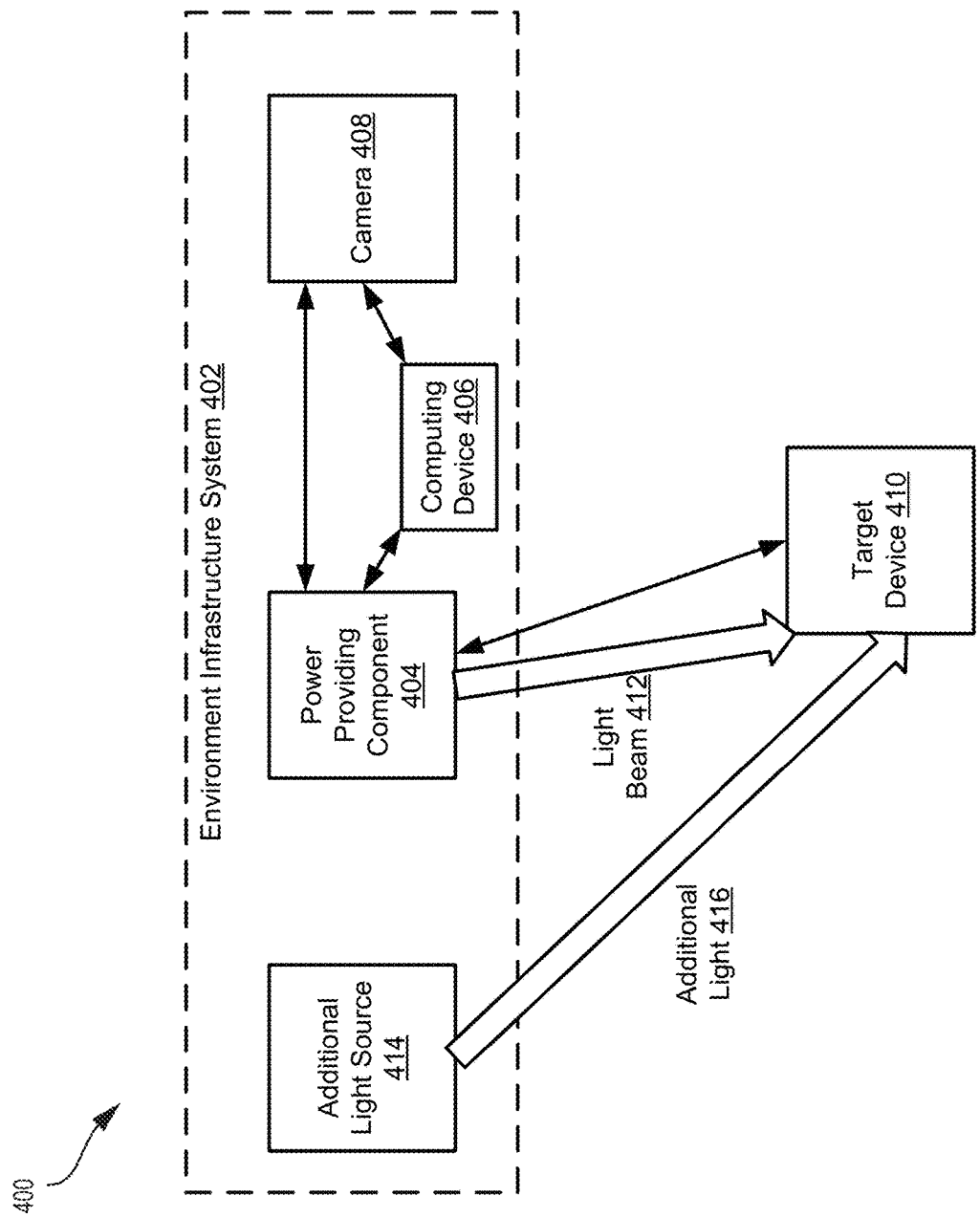
FIG. 4 is a block diagram illustrating a system for providing power to target devices, in accordance with some examples.

FIG. 4 is a block diagram of an example environment 400 in accordance with one or more examples described herein. As shown in FIG. 4, the environment 400 includes an environment infrastructure system 402 and a target device 410. In some examples, the environment infrastructure system 402 includes a power providing component 404, a computing device 406, a camera 408, and an additional light source 414. Each of these components is described below.

In some examples, the power providing component 404 is the same or substantially similar to the power providing component 104 shown in FIG. 1 and described above, and/or to the power providing component 300 shown in FIG. 3 and described above. In some examples, the computing device 406 is the same or substantially similar to the computing device 106 shown in FIG. 1 and described above. In some examples, the camera 408 is the same or substantially similar to the camera 108 shown in FIG. 1 and described above. In some examples, the target device 410 is the same or substantially similar to the target device 110 shown in FIG. 1 and described above, and/or to the target device 200 shown in FIG. 2 and described above.

The environment 400 shown in FIG. 4 differs from the environment 100 shown in FIG. 1 in that the environment infrastructure system 402 includes the additional light source 414. The additional light source 414 may be any source of light capable of being received by the target device 410. As an example, the additional light source 414 may be ambient light (e.g., from overhead lighting) in the environment 400. As another example, the additional light source 414 may be a dedicated light source (e.g., a lamp) positioned to shine light on one or more target devices (e.g., target device 410) in the environment 400. As another example, the additional light source 414 may be sunlight (e.g., from a window or skylight) that is in the environment 400. As another example, the additional light source 414 may be a separate power providing component in the environment infrastructure system 402.

In some examples, the existence of the additional light source 414 impacts the determination of how much energy the power providing component 404 provides to the target device 410. Specifically, in some examples, the additional light source provides energy to the target device 410 separately, and as such reduces the amount of energy that must be provided by the power providing component 404 in order to satisfy the power requirement of the target device 410 for performing one or more particular operations. Said another way, in some examples, the energy to be provided to the target device 410 from the power providing component 404 via the light beam 412 is reduced by the amount of energy provided to the target device 410 by the additional light source 414 via the additional light 416.

While FIG. 4 shows a certain number of components in a particular configuration, one of ordinary skill in the art will appreciate that the environment 400 may include more components or fewer components, and/or components arranged in any number of alternate configurations without departing from the scope of examples described herein. As an example, there may be any number of power providing components, computing devices, cameras, additional light sources and/or target devices. As another example, the environment infrastructure system may include no cameras, if other techniques are to be employed for a device discovery procedure. Accordingly, examples disclosed herein should not be limited to the configuration of components shown in FIG. 4.

Figure 5:
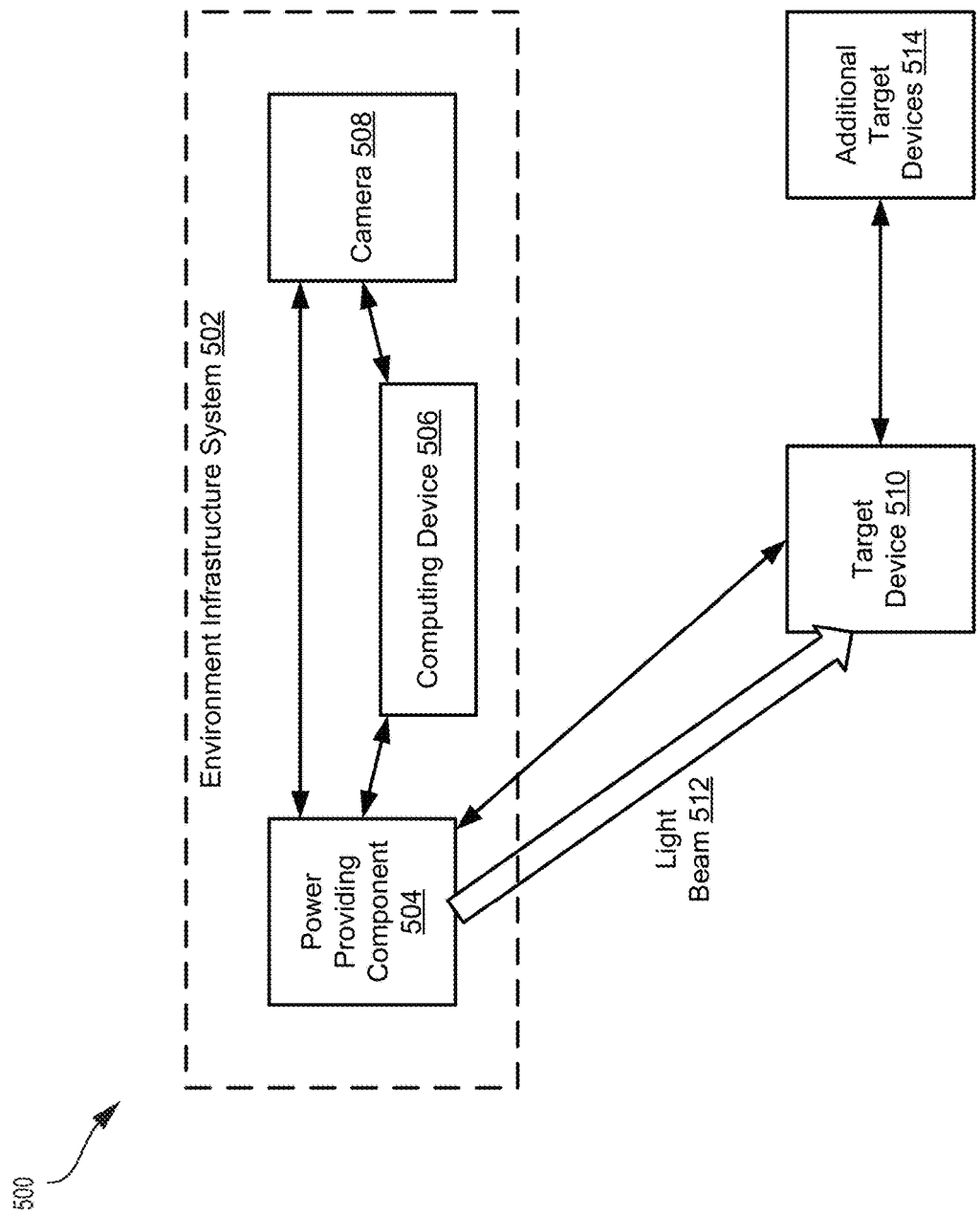
FIG. 5 is a block diagram illustrating a system for providing power to target devices, in accordance with some examples.

FIG. 5 is a block diagram of an example environment 500 in accordance with one or more examples described herein. As shown in FIG. 5, the environment 500 includes an environment infrastructure system 502, a target device 510, and additional target devices 514. In some examples, the environment infrastructure system 502 includes a power providing component 504, a computing device 506, and a camera 508. Each of these components is described below.

In some examples, the power providing component 504 is the same or substantially similar to the power providing component 104 shown in FIG. 1 and described above, and/or to the power providing component 300 shown in FIG. 3 and described above. In some examples, the computing device 506 is the same or substantially similar to the computing device 106 shown in FIG. 1 and described above. In some examples, the camera 508 is the same or substantially similar to the camera 108 shown in FIG. 1 and described above. In some examples, the target device 510 is the same or substantially similar to the target device 110 shown in FIG. 1 and described above, and/or to the target device 200 shown in FIG. 2 and described above.

The environment 500 shown in FIG. 5 differs from the environment 100 shown in FIG. 1 in that the environment 500 includes the additional target devices 514. In some examples, the additional target devices 514 are each the same or substantially similar to the target device 110 shown in FIG. 1 and described above, and/or to the target device 200 shown in FIG. 2 and described above. In some examples, the additional target devices 514 are each operatively connected to the target device 410. The additional target devices 514 may be directly connected to the target device 410, or may be indirectly connected to the target device 410 (e.g., via intervening other target devices).

In some examples, the additional target devices 514 may communicate with the target device to allow indirect communication with one or more components of the environment infrastructure system. Such communication may be for any purpose. As an example, one or more of the additional target devices 514 may request power from the target device 510, and the target device 510 may, in turn, communicate with one or more components of the environment infrastructure system 502 to request power from the power providing component 504. Such power, provided via the light beam 512 to the target device 510, may then be conveyed from the target device 510 to one or more of the additional target devices 514. In some examples, the power is provided to the one or more additional target devices 514 as it is received by the target device 510. Additionally or alternatively, in examples in which the target device includes a power storage component (e.g., power storage component 204 shown in FIG. 2 and described above), the target device 410 may provide power from the power storage component to the one or more additional target devices 514, and may or may not then communicate with one or more components of the environment infrastructure system 502 to request additional power to replace the power that was provided to the one or more additional target devices 514.

In some examples, the target device 510 facilitates communication between the additional target devices 514 and one or more components of the environment infrastructure system 502 to facilitate communication of data to or from the additional target devices 514. As an example, one or more of the additional target devices 514 may seek to communicate information such as sensor data, results of operations, processed data, identifying information, power requirements information, etc. to one or more components of the environment infrastructure system 502, and thus may do so by first communicating the information to the target device 510 which, in turn, communicates the information to one or more of the components of the environment infrastructure system 502. As another example, one or more components of the environment infrastructure system 502 may seek to communicate information (e.g., requests for identifying information, requests for data, requests to perform operations, requests for power requirement information, etc.) to one or more of the additional target devices 514.

While FIG. 5 shows a certain number of components in a particular configuration, one of ordinary skill in the art will appreciate that the environment 500 may include more components or fewer components, and/or components arranged in any number of alternate configurations without departing from the scope of examples described herein. As an example, there may be any number of power providing components, computing devices, cameras, additional light sources (not shown) and/or target devices. As another example, the environment infrastructure system may include no cameras, if other techniques are to be employed for a device discovery procedure. Accordingly, examples disclosed herein should not be limited to the configuration of components shown in FIG. 5.

Figure 6:
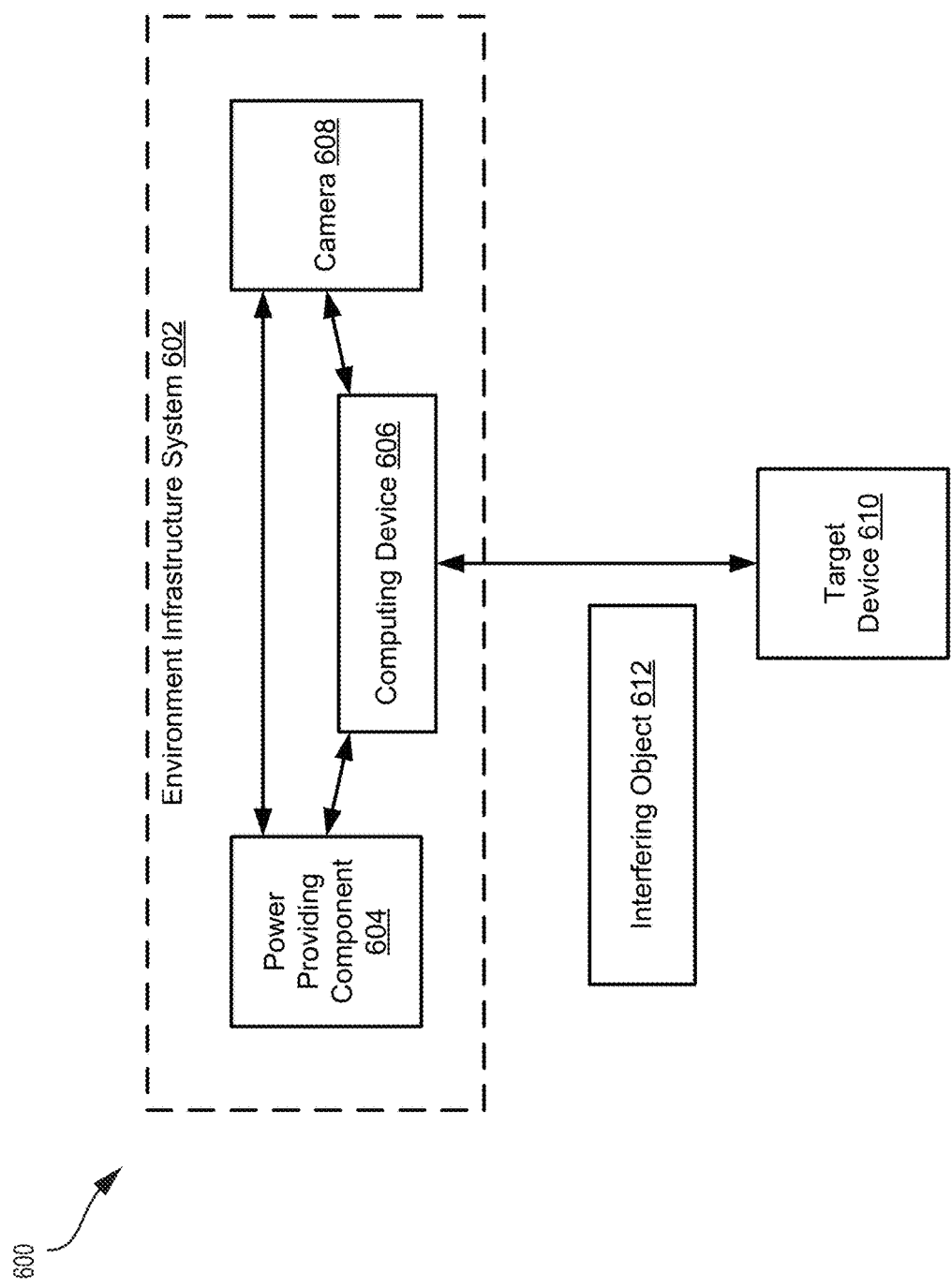
FIG. 6 is a block diagram illustrating a system for providing power to target devices, in accordance with some examples.

FIG. 6 is a block diagram of an example environment 600 in accordance with one or more examples described herein. As shown in FIG. 6, the environment 600 includes an environment infrastructure system 602, a target device 610, and an interfering object 612. In some examples, the environment infrastructure system 602 includes a power providing component 604, a computing device 606, and a camera 608. Each of these components is described below.

In some examples, the power providing component 604 is the same or substantially similar to the power providing component 104 shown in FIG. 1 and described above, and/or to the power providing component 300 shown in FIG. 3 and described above. In some examples, the computing device 606 is the same or substantially similar to the computing device 106 shown in FIG. 1 and described above. In some examples, the camera 608 is the same or substantially similar to the camera 108 shown in FIG. 1 and described above. In some examples, the target device 610 is the same or substantially similar to the target device 110 shown in FIG. 1 and described above, and/or to the target device 200 shown in FIG. 2 and described above.

The environment 600 shown in FIG. 6 differs from the environment 100 shown in FIG. 1 in that the interfering object 612 is between the power providing component 604 and the target device 610. The interfering object 612 may be any object for which it may not be desired that a light beam from the power providing component 604 interacts with the object. As an example, as a safety measure, the environment infrastructure system 602 may be configured to pause providing power to the target device 610 when a person or animal is present in the environment 600. As another example, the environment infrastructure system 602 may be configured to pause providing power when certain types of objects that may be sensitive to light (e.g., robots, other equipment, various goods, etc.) are in between the power providing component 604 and the target device 610.

While FIG. 6 shows a certain number of components in a particular configuration, one of ordinary skill in the art will appreciate that the environment 600 may include more components or fewer components, and/or components arranged in any number of alternate configurations without departing from the scope of examples described herein. As an example, there may be any number of power providing components, computing devices, cameras, additional light sources (not shown) and/or target devices. As another example, the environment infrastructure system may include no cameras, if other techniques are to be employed for a device discovery procedure. Accordingly, examples disclosed herein should not be limited to the configuration of components shown in FIG. 6.

Figure 7:
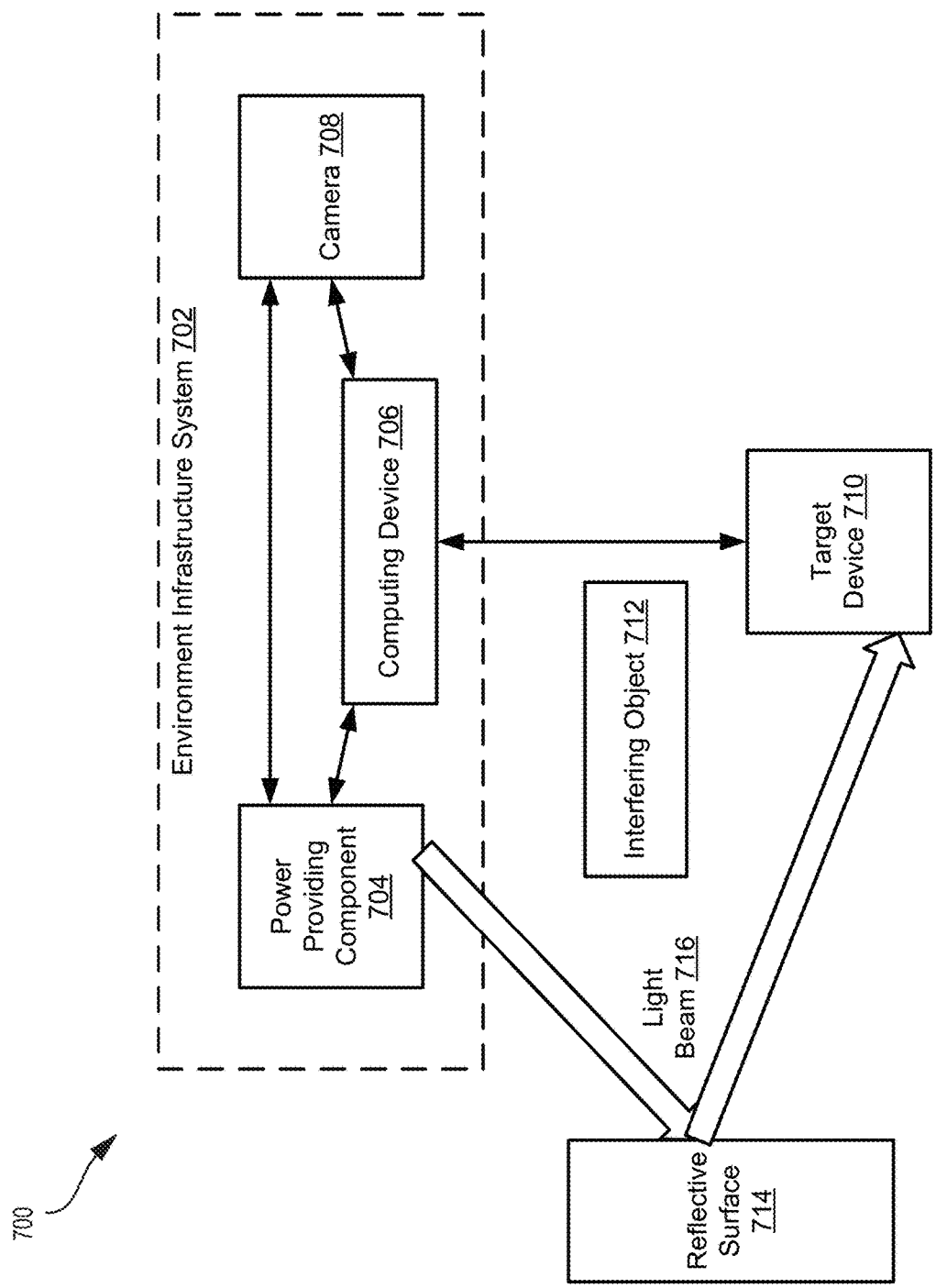
FIG. 7 is a block diagram illustrating a system for providing power to target devices, in accordance with some examples.

FIG. 7 is a block diagram of an example environment 700 in accordance with one or more examples described herein. As shown in FIG. 7, the environment 700 includes an environment infrastructure system 702, a target device 710, an interfering object 712, and a reflective surface. In some examples, the environment infrastructure system 702 includes a power providing component 704, a computing device 706, and a camera 708. Each of these components is described below.

In some examples, the power providing component 704 is the same or substantially similar to the power providing component 104 shown in FIG. 1 and described above, and/or to the power providing component 300 shown in FIG. 3 and described above. In some examples, the computing device 706 is the same or substantially similar to the computing device 706 shown in FIG. 1 and described above. In some examples, the camera 708 is the same or substantially similar to the camera 108 shown in FIG. 1 and described above. In some examples, the target device 710 is the same or substantially similar to the target device 110 shown in FIG. 1 and described above, and/or to the target device 200 shown in FIG. 2 and described above. In some examples, the interfering object 712 is the same or similar to the interfering object 612 shown in FIG. 6 and discussed above. Additionally or alternatively, the interfering object may be a permanently or semi-permanently positioned component of the environment 700 that interrupts the line of sight between the power providing component 704 and the target device 710.

The environment 700 shown in FIG. 7 differs from the environment 100 shown in FIG. 1 in that the interfering object 712 is between the power providing component 704 and the target device 710. The environment 700 shown in FIG. 7 also differs from the environment 600 shown in FIG. 6 in that rather than pausing the transmission of a light beam from the power providing component 704 to the target device 710 based on the presence and location of the interfering object 712, the power providing component 704 instead directs the light beam 716 towards the target device 710 via the reflective surface 714. In some examples, the reflective surface 714 is any surface capable of wholly or partially reflecting a light beam. In some examples, according to the law of reflection, when the light beam is received at a given angle of incidence, the light beam is reflected from the reflective surface 714 at an angle of reflection equal to the angle of incidence. In some examples, the reflective surface 714 is at least partially controllable, such that the light beam 716 may be reflected in any number of directions to any number of target devices in the environment 700. Although not shown in FIG. 7, the reflective surface 714 may include any number of discrete separate reflective surfaces for reflecting light beams at target devices. Additionally or alternatively, although not shown in FIG. 7, the environment 700 may include any number of reflective surfaces for directing light beams from the power providing component 704 to one or more target device (e.g., the target device 710). Such additional reflective surfaces may be configured to reflect light beams to different sets of one or more target devices. Additionally or alternatively, sets of reflective surfaces may be used to reflect a light beam multiple times to direct the light beam around any number of interfering objects to the target device 710.

While FIG. 7 shows a certain number of components in a particular configuration, one of ordinary skill in the art will appreciate that the environment 700 may include more components or fewer components, and/or components arranged in any number of alternate configurations without departing from the scope of examples described herein. As an example, there may be any number of power providing components, computing devices, cameras, additional light sources (not shown) and/or target devices. As another example, the environment infrastructure system may include no cameras, if other techniques are to be employed for a device discovery procedure. Accordingly, examples disclosed herein should not be limited to the configuration of components shown in FIG. 7.

Figure 8:
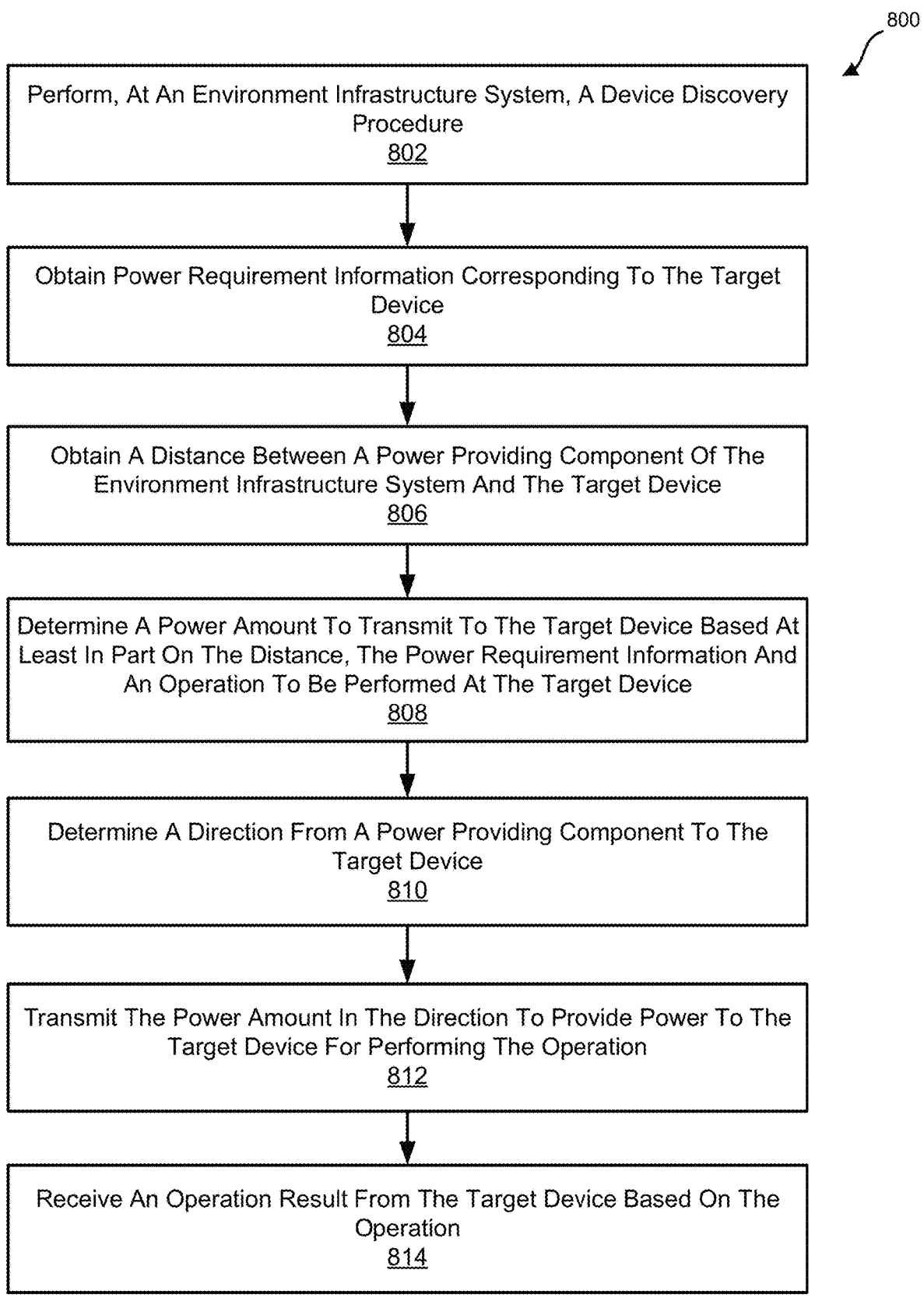
FIG. 8 is a flow diagram illustrating an example of a process for providing power to target devices, in accordance with some examples.

FIG. 8 is a flow diagram illustrating an example of a process 800 for providing power to target devices in accordance with examples described herein. The process 800 may be performed, at least in part, for example, by the environment infrastructure system 102 shown in FIG. 1, the environment infrastructure system 402 shown in FIG. 4, the environment infrastructure system 502 shown in FIG. 5, the environment infrastructure system 602 shown in FIG. 6, and or the environment infrastructure system 702 shown in FIG. 7. Additionally or alternatively, the process 800, or any portions therein, may be performed by components withing any of the environment infrastructure systems, such as the power providing component (e.g., 104 of FIG. 1, 300 of FIG. 3, 404 of FIG. 4, 504 of FIG. 5, 604 of FIG. 6, 704 of FIG. 7) and/or the computing device (e.g., 106 of FIG. 1, 406 of FIG. 4, 506 of FIG. 5, 606 of FIG. 6, 706 of FIG. 7).

At block 802, the process 800 includes performing, at an environment infrastructure system, a device discovery procedure to discover a target device in an environment. The device discovery procedure may be performed by one or more components of an environment infrastructure system (e.g., a power providing component, a computing device, and/or a camera). A device discovery procedure may include any technique for locating and identifying a target device (e.g., target device 110 of FIG. 1, target device 200 of FIG. 2) in an environment. As an example, the environment infrastructure system may, in addition to a power providing component, include one or more cameras. Such cameras may be able to perceive the environment (e.g., a warehouse), and/or be controlled to perceive portions of the environment. In some examples, images obtained by a camera in the environment may be processed (e.g., by a computing device included in and/or operatively connected to the power providing component and/or the camera) to determine the location of one or more target devices in the environment. Any technique for identifying a target device in an environment using a camera may be used without departing from the scope of examples described herein. As an example, target devices may have a perceivable informative marker (e.g., a Quick Response (QR) code) that may be identified in an image. A perceivable informative marker may convey any type of information to the environment infrastructure system, or any component therein. Examples of such information include, but are not limited to, an identification of the target device (e.g., a serial number, model number, unit number, etc.), information related to the devices intended purpose (e.g., obtain sensor data from one or more sensors, process sensor information, execute a machine learning model, etc.), information related to the power requirements of the target device, etc. As another example of identifying target devices in images, an image obtained by a camera of an environment infrastructure system may be provided to a computing device, which may use the image as input to a trained object detection and identification model (e.g., a machine learning model) that locates and identifies the target device in the image.

In some examples, the device discovery procedure is performed without the use of a camera. As an example, one or more power providing components of an environment infrastructure system may scan an environment with one or more beams of light. In some examples, when a beam of light reaches a target device, the target device may harvest the light for enough power to communicate information to one or more components of the environment infrastructure system. Such information may include, but is not limited to, an identification of the target device (e.g., a serial number, model number, unit number, etc.), information related to the devices intended purpose (e.g., obtain sensor data from one or more sensors, process sensor information, etc.), information related to the power requirements of the target device, etc.

Other techniques for discovering target devices in an environment may be used without departing from the scope of examples described herein. As an example, an environment infrastructure system, or any one or more components therein, may include and/or be operatively connected to one or more data structures that store information about target devices in an environment, including, for example, the existence and location of the one or more target devices. In some examples, the one or more data structures may be accessed, and information therein regarding one or more particular target devices may be obtained as part of a device discovery procedure.

At block 804, the process 800 includes obtaining power requirement information corresponding to the target device. Obtaining power requirement information corresponding to a target device may be performed by any component of an environment infrastructure system (e.g., a power providing component, a computing device, a camera), or any combination of such components. In some examples, power requirement information for a target device includes the amount of power (e.g., fifty milliwatts (mW)) that the target device needs to perform one or more operations. Power requirement information for a target device may include any number of separate power amounts, each corresponding to one or more types of operations that a target device may perform (e.g., wake up, transmit information, obtain data, perform calculations and operations, etc.). Any technique for obtaining power requirement information may be used without departing from the scope of examples described herein. As an example, a data structure included in and/or operatively connected to one or more components of the environment infrastructure system (e.g., a computing device, a power providing component, etc.) may be accessed, and power requirement information may be obtained therefrom (e.g., by looking up a device type discovered during a device discovery procedure). As another example, in response to a device discovery procedure, the discovered target device may transmit power requirement information to one or more components (e.g., a computing device, a power providing component, etc.) of an environment infrastructure system. As another example, a perceivable informative marker displayed on the target device may be designed to convey power requirement information (e.g., an image obtained by a camera may be processed to derive the power requirement information from a perceivable informative marker of the target device in the image).

At block 806, the process 800 includes obtaining a distance between a power providing component of the environment infrastructure system and the target device. The distance may be obtained by any component of an environment infrastructure system (e.g., a power providing component, a computing device, a camera), or any combination of such components. Any technique for obtaining the distance between a target device and one or more power providing components may be used without departing from the scope of examples described herein. As an example, a data structure included in and/or operatively connected to one or more components of the environment infrastructure system (e.g., a computing device, a power providing component, etc.) may be accessed, and distance information may be obtained therefrom. As another example, one or more images image obtained by one or more cameras of the environment infrastructure may be processed to determine the distance between the target device and one or more power providing components. Examples of processing one or more images to determine the distance may include, but are not limited to: deriving the distance from the target device to the one or more cameras, and combining that information with a known position of the one or more cameras relative to the one or more power providing components in the environment; using one or more images that include both the target device and the one or more power providing components and using a technique (e.g., based on a reference object or distance, known pixel size, etc.) to determine the distance; using the one or more images as input to a trained machine learning model for identifying an object, which allows the size of the object to be known, thereby allowing a distance to be derived; etc.

At block 808, the process 800 includes determining a power amount to transmit to the target device based at least in part on the distance, the power requirement information, and an operation to be performed at the target device. Determining a power amount to transmit to a target device may be determined by any component of an environment infrastructure system (e.g., a power providing component, a computing device, a camera), or any combination of such components. In some examples, the power amount corresponds to the amount of energy to be transmitted to the target device via a light beam from the power providing component. As an example, when an operation to be performed by the target device is known, the power required for the target device to perform the operation may be ascertained from the previously obtained power requirement information for the target device. In such a scenario, the energy of light beam to be directed at the target device may be calculated based, at least in part, on the distance between the target device and the one or more power providing components, such that a power harvesting component of the target device can convert the light energy into an amount of electrical power sufficient to perform the operation. Different operations may require different amounts of power for different operations. Any light source may be used by a power providing component, and any technique for directing light from such a light source as a beam of light to a target device without departing from the scope of examples described herein. In some examples, a light beam is a group of light rays traveling generally in the same direction (e.g., a straight line), thereby conveying energy by way of photons in the direction that the light beam propagates. The amount of energy conveyed by a light beam may reduce as a function of distance, which is why in may be necessary to obtain the distance from a target device to one or more power providing components in order to determine, at least in part, the necessary energy of a light beam to provide a certain amount of power to a target device.

Other considerations may be included in a determination of the amount of power to be projected towards a target device by a power providing component. Such considerations may include, but are not limited to: whether other power providing components will also be providing power to the target device; whether the target device is in a direct line of sight from the power providing component or if the light beam is to be reflected to the target device from a reflective surface (e.g., the reflective surface 714 shown in FIG. 7); whether the target device is configured with any component (e.g., a Fresnel lens) capable of focusing and/or increasing the amount of power provided by received light beam; one or more characteristics of the power harvesting component of the target device (e.g., conversion efficiency); whether the target device has or is receiving light or power from any other source (e.g., ambient light, dedicated light source near the target device; piezoelectric components, the sun, etc.), such as, for example, the additional light source 414 shown in FIG. 4; whether the operation to be performed by the target device will require additional operations (e.g., transmitting obtained data back to a component of the environment infrastructure system); whether the target device is configured to provide all or any portion of the power to other target devices; the amount of time the target device will require a certain level of power; etc.

At block 810, the process 800 includes determining a direction from the power providing component to the target device. Determining the direction may be performed by any component of an environment infrastructure system (e.g., a power providing component, a computing device, a camera), or any combination of such components. In some examples, the direction is determined in order to transmit a light beam from a power providing component to a target device to provide power to the target device for performing one or more operations. Any suitable technique may be used to determine the direction between a power providing component and a target device without departing from the scope of examples described herein. As an example, a data structure included in and/or operatively connected to one or more components of the environment infrastructure system (e.g., a computing device, a power providing component, etc.) may be accessed, and a direction may be obtained or derived based on data therein. As another example, one or more images obtained by one or more cameras of an environment infrastructure system may be processed to determine a direction from a power providing component to a target device. As used herein, direction may refer to a direct direction (e.g., a straight line) from a power providing component to a target component, or to a direction that a light beam must be directed to ultimately reach the target device (e.g., when the light beam is to first be reflected off of one or more reflective surfaces before reaching the target device).

At block 812, the process 800 includes transmitting the power amount in the direction to provide power to the target device for performing the operation. In some examples, the power amount is transmitted by a power providing component of an environment infrastructure system. In some examples, the power amount is transmitted as light energy via a light beam transmitted from the power providing component to the target device. In some examples, the amount of time that the light beam is targeted at the target device is dependent, at least in part, on the amount of power that is intended to be provided to the device, which may, for example, depend at least in part on the conversion efficiency of the one or more power harvesting components of the target device. In some examples, the light energy from the light beam is converted to electrical power by the one or more power harvesting components of the target device.

In some examples, as discussed above, the target device includes one of more power harvesting components (e.g., photo-voltaic panels) capable of converting the energy of received light into electrical power to be used by the target device to perform one or more operations (e.g., transmitting information, obtaining data, performing calculations, updating software or firmware, etc.). In some examples, the electrical power is consumed by the target device as it is received. Additionally or alternatively, in some examples, all or any portion of the electrical energy may be stored (e.g., in a battery included in and/or operatively connected to the target device). Receiving power to store in a battery may be considered an example of an operation that a target device may perform in response to receiving light energy from a power providing component. In some examples, a target device is configured to provide power to other target devices. As an example, a particular target device in an environment may be operatively connected to one or more additional target devices that cannot receive power from a power providing component (e.g., because they lack power harvesting components, because they are not in the line of sight from a power providing component, etc.). In such a scenario, the target device that receives power from a power providing component may function as a conduit between the additional one or more target devices and one or more components of the environment infrastructure system. The conduit may be configured to convey power from one or more power providing components to the one or more additional target devices, as well as convey information between (e.g., to and/or from) the one or more additional target devices and one or more components of the environment infrastructure system.

In some examples, the environment infrastructure system, or any one or more components therein, are configured to detect the presence of objects (e.g., one or more people) in the environment and, if detected, to pause the transmission of power to target devices via light beams until such time as the object is no longer in the environment, and/or is not between a power providing component and a target device to which power is being provided via a light beam. Additionally or alternatively, the power providing component may alter the direction in which the light beam is to be transmitted towards one or more reflective surfaces, such that the light beam reaches the target device by traversing around an interfering object between the power providing component and the target device.

At block 814, the process 800 includes receiving an operation result from the target device based on the operation. The operation result may be received by any component of an environment infrastructure system (e.g., a power providing component, a computing device, a camera), or any combination of such components. The operation result may be any information received from a target device. Examples of operation results include, but are not limited to, identifying information of a target device, information from additional target devices, results of calculations and/or operations, raw sensor data, processed or pre-processed sensor data, outputs of machine learning models, requests for power, power requirement information, status information of a target device, etc.

In some examples, the processes 800, or any other process described herein may be performed by a computing device or apparatus, and/or one or more components therein and/or to which the computing device is operatively connected. As an example, the process 800 may be performed wholly or in part by the power providing component 104 of environment infrastructure system 102 shown in FIG. 1, the power providing component 300 shown in FIG. 3, the power providing component 404 shown in FIG. 4, the power providing component 504 shown in FIG. 5, the power providing component 604 shown in FIG. 6, and/or the power providing component 704 shown in FIG. 7. As another example, the process 800 may be performed wholly or in part by the computing device 106 shown in FIG. 1, the computing device 406 shown in FIG. 4, the computing device 506 shown in FIG. 5, the computing device 606 shown in FIG. 6, and/or the computing device 706 shown in FIG. 7. As another example, the processes may be performed wholly or in part by the computing system 900 shown in FIG. 9, which, though not illustrated in FIG. 9, may include and/or be operatively connected to at least one power providing component. Portions of the process 800 may be performed by other components of an environment infrastructure system (e.g., the camera 108 shown in FIG. 1) without departing from the scope of examples described herein.

The computing device can include any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, and/or any other computing device with the resource capabilities to perform the processes described herein, including the process 800 and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the operations of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented, at least in part, using computer software, firmware, or any combination thereof, to perform the various operations described herein.

The processes 800 shown in FIG. 8 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
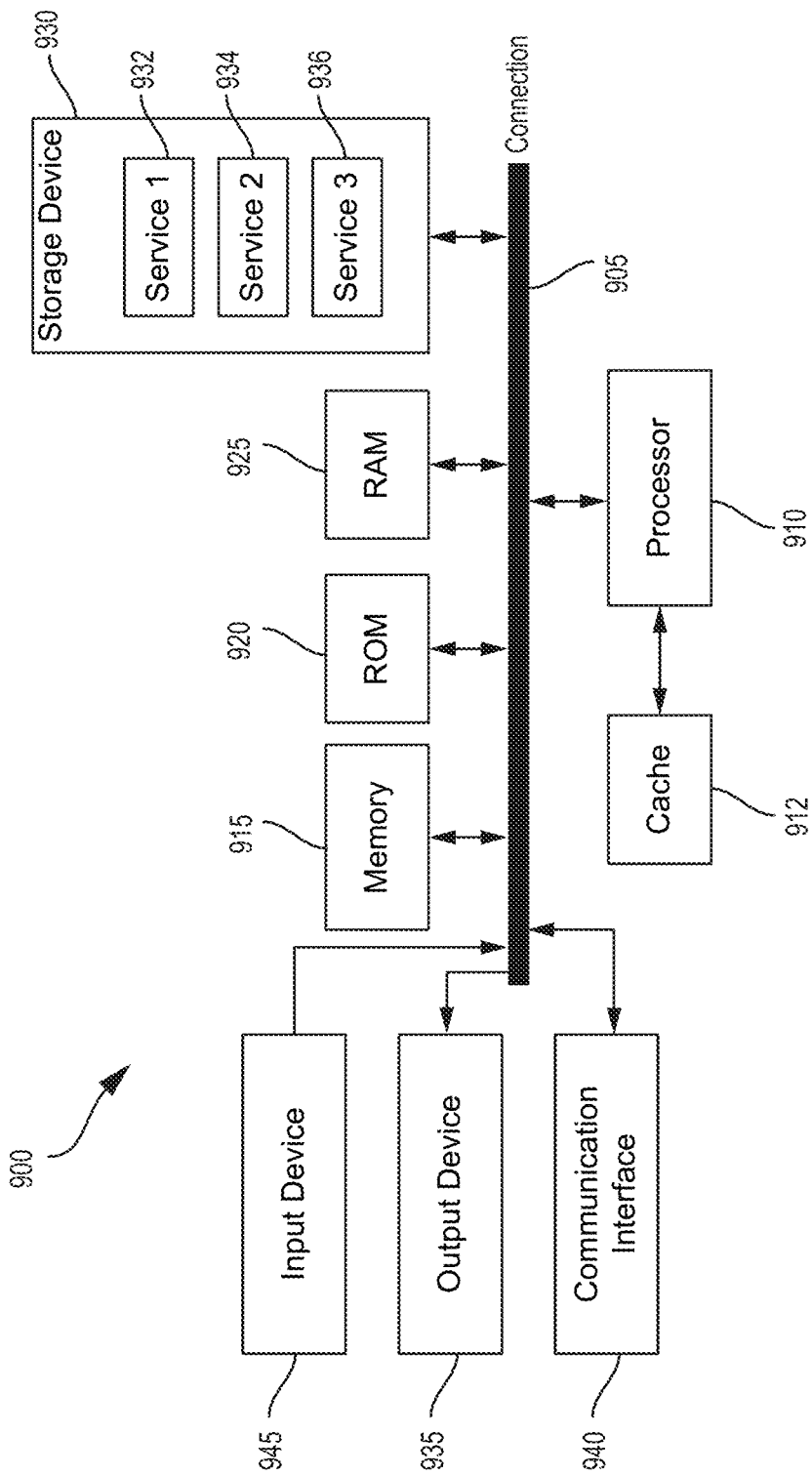
FIG. 9 is a diagram illustrating an example of a computing system for implementing certain aspects described herein.

FIG. 9 is a diagram illustrating an example of a system for implementing certain aspects of the present technology. In particular, FIG. 9 illustrates an example of computing system 900, which can be for example any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some examples, computing system 900 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash storage, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some examples, a hardware service that performs a particular function can include the software component stored in a computer-readable medium in connection with the necessary hardware components, such as processor 910, connection 905, output device 935, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples and examples provided herein. However, it will be understood by one of ordinary skill in the art that the examples may be practiced without these specific details. For clarity of explanation, in some instances the present technology may be presented as including individual functional blocks including functional blocks comprising devices, device components, operations, steps, or routines in a method embodied in software, hardware, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples described herein can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm operations described in connection with the examples disclosed herein may be implemented as electronic hardware, computer software, firmware, or combinations thereof. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM)

such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method for providing power for target devices, the method comprising: performing, at an environment infrastructure system, a device discovery procedure to discover a target device in an environment; obtaining power requirement information corresponding to the target device; obtaining a distance between a power providing component of the environment infrastructure system and the target device; determining a power amount to transmit to the target device based at least in part on the distance, the power requirement information, and an operation to be performed at the target device; determining a direction from the power providing component to the target device; transmitting the power amount in the direction to provide power to the target device for performing the operation; and receiving an operation result from the target device based on the operation.

Aspect 2: The method of aspect 1, wherein transmitting the power amount comprises directing, at the power providing component, a light beam at a power harvesting component of the target device.

Aspect 3: The method of aspect 2, wherein the power harvesting component comprises a photo-voltaic panel.

Aspect 4: The method of any of aspects 1 to 3, wherein performing the device discovery procedure comprises: obtaining, using a camera, an image of at least a portion of the environment; and identifying the target device in the environment using the image.

Aspect 5: The method of aspect 4, wherein identifying the target device in the environment using the image comprises identifying a perceivable informative marker attached to the target device.

Aspect 6: The method of any of aspects 1 to 5, wherein performing the device discovery procedure comprises: scanning the environment using a light beam from the power providing component; and receiving a communication from the target device when the light beam interacts with a power harvesting component of the target device.

Aspect 7: The method of any of the aspects 1 to 6, wherein the power requirement information is obtained from a target device power requirement data structure by the power providing component.

Aspect 8: The method of any of aspects 1 to 7, wherein the power requirement information is obtained from the target device after performing the device discovery procedure.

Aspect 9: The method of any of aspects 1 to 8, wherein the environment infrastructure system comprises the power providing component, a camera, and an additional light source, the method further comprising: providing additional power to the target device using the additional light source.

Aspect 10: The method of any of aspects 1 to 9, wherein the operation result comprises data generated by the target device using at least a portion of the power amount.

Aspect 11: The method of any of aspects 1 to 10, wherein the operation result comprises a request for additional power, the method further comprising: providing, based on the request for additional power, a higher amount of power to the target device from the power providing component.

Aspect 12: The method of aspect 11, further comprising: receiving a second operation result at the environment infrastructure system based on a second operation of the target devices performed using the higher amount of power.

Aspect 13: The method of any of aspects 1 to 12, further comprising: determining that an interfering object enters the environment; and pausing the transmitting of the power amount based on determining that the interfering object enters the environment.

Aspect 14: The method of any of aspects 1 to 13, wherein obtaining the distance comprises calculating the distance.

Aspect 15: An environment infrastructure system for providing power for target devices, comprising: a power providing component; a memory device; and a processor coupled to the memory device and the power providing component and configured to: perform a device discovery procedure to discover a target device in an environment; obtain power requirement information corresponding to the target device; obtain a distance between the power providing component and the target device; determine a power amount to transmit to the target device based at least in part on the distance, the power requirement information, and an operation to be performed at the target device; determine a direction from the power providing component to the target device; transmit the power amount in the direction to provide power to the target device for performing the operation; and receive an operation result from the target device based on the operation.

Aspect 16: The environment infrastructure system of aspect 15, wherein the power providing component is configured to transmit the power amount by directing a light beam at a power harvesting component of the target device.

Aspect 17: The environment infrastructure system of aspect 16, wherein the power harvesting component comprises a photo-voltaic panel.

Aspect 18: The environment infrastructure system of any one of aspects 15 to 17, further comprising a camera coupled to the processor, and wherein, to perform the device discovery procedure, the processor is further configured to: obtain, using the camera, an image of at least a portion of the environment; and identify the target device in the environment using the image.

Aspect 19: The environment infrastructure system of aspect 18, wherein, to identify the target device in the environment using the image, the processor is further configured to identify a perceivable informative marker attached to the target device.

Aspect 20: The environment infrastructure system of any one of aspects 15 to 19, wherein, to perform the device discovery procedure, the processor is further configured to: scan the environment using a light beam from the power providing component; and receive a communication from the target device when the light beam interacts with a power harvesting component of the target device.

Aspect 21: The environment infrastructure system of any one of aspects 15 to 20, wherein the power requirement information is obtained from a target device power requirement data structure by the power providing component.

Aspect 22: The environment infrastructure system of any one of aspects 15 to 21, wherein the power requirement information is obtained from the target device after performing the device discovery procedure.

Aspect 23: The environment infrastructure system of any one of aspects 15 to 22, wherein the environment infrastructure system further comprises a camera coupled to the processor and an additional light source, and wherein the processor is further configured to: provide additional power to the target device using the additional light source.

Aspect 24: The environment infrastructure system of any one of aspects 15 to 23, wherein the operation result comprises data generated by the target device using at least a portion of the power amount.

Aspect 25: The environment infrastructure system of any one of aspects 15 to 24, wherein the operation result comprises a request for additional power, the processor is further configured to: provide, based on the request for additional power, a higher amount of power to the target device from the power providing component.

Aspect 26: The environment infrastructure system of aspect 25, wherein the processor is further configured to: receive a second operation result at the environment infrastructure system based on a second operation of the target devices performed using the higher amount of power.

Aspect 27: The environment infrastructure system of any one of aspects 15 to 26, wherein the processor is further configured to: determine that an interfering object enters the environment; and pause the transmitting of the power amount based on determining that the interfering object enters the environment.

Aspect 28: The environment infrastructure system of any one of aspects 15 to 27, wherein, to obtain the distance, the processor is further configured to calculate the distance.

Aspect 29: A non-transitory computer-readable medium having stored thereon instructions that, when executed by one or more processors, cause the one or more processors to perform operations according to any of aspects 1 to 28.

Aspect 29: An apparatus for providing power for target devices including means for performing operations according to any of aspects 1 to 28.

What is claimed is:

1. A method for providing power for target devices, the method comprising:
performing, at an environment infrastructure system, a device discovery procedure to discover a target device in an environment, wherein the target device comprises a sensor;
obtaining power requirement information corresponding to the target device;
determining a distance between a power providing component of the environment infrastructure system and the target device based on an obtained image of the target device in the environment;
determining a power amount to transmit to the target device based at least in part on the distance, the power requirement information, and an operation to be performed at the target device;
determining a direction from the power providing component to the target device;
transmitting the power amount in the direction to provide power to the target device for performing the operation; and
receiving an operation result from the target device based on the operation.

2. The method of claim 1, wherein transmitting the power amount comprises directing, at the power providing component, a light beam at a power harvesting component of the target device.

3. The method of claim 2, wherein the power harvesting component comprises a photo-voltaic panel.

4. The method of claim 1, wherein performing the device discovery procedure comprises:
obtaining, using a camera, an image of at least a portion of the environment; and
identifying the target device in the environment using the image.

5. The method of claim 4, wherein identifying the target device in the environment using the image comprises identifying a perceivable informative marker attached to the target device.

6. The method of claim 1, wherein performing the device discovery procedure comprises:
scanning the environment using a light beam from the power providing component; and
receiving a communication from the target device when the light beam interacts with a power harvesting component of the target device.

7. The method of claim 1, wherein the power requirement information is obtained from a target device power requirement data structure by the power providing component.

8. The method of claim 1, wherein the power requirement information is obtained from the target device after performing the device discovery procedure.

9. The method of claim 1, wherein the environment infrastructure system comprises the power providing component, a camera, and an additional light source, the method further comprising:
providing additional power to the target device using the additional light source.

10. The method of claim 1, wherein the operation result comprises data generated by the target device using at least a portion of the power amount.

11. The method of claim 1, wherein the operation result comprises a request for additional power, the method further comprising:
providing, based on the request for additional power, a higher amount of power to the target device from the power providing component.

12. The method of claim 11, further comprising:
receiving a second operation result at the environment infrastructure system based on a second operation of the target devices performed using the higher amount of power.

13. The method of claim 1, further comprising:
determining that an interfering object enters the environment; and pausing the transmitting of the power amount based on determining that the interfering object enters the environment.

14. The method of claim 1, wherein obtaining the distance comprises calculating the distance.

15. An environment infrastructure system for providing power for target devices, the environment infrastructure system comprising:
a power providing component;
a memory device; and
a processor coupled to the memory device and the power providing component and configured to:
perform a device discovery procedure to discover a target device in an environment, wherein the target device comprises a sensor;
obtain power requirement information corresponding to the target device;
determine a distance between the power providing component and the target device based on an obtained image of the target device in the environment;
determine a power amount to transmit to the target device based at least in part on the distance, the power requirement information, and an operation to be performed at the target device;
determine a direction from the power providing component to the target device;
transmit the power amount in the direction to provide power to the target device for performing the operation; and
receive an operation result from the target device based on the operation.

16. The environment infrastructure system of claim 15, wherein the power providing component is configured to transmit the power amount by directing a light beam at a power harvesting component of the target device.

17. The environment infrastructure system of claim 16, wherein the power harvesting component comprises a photo-voltaic panel.

18. The environment infrastructure system of claim 15, further comprising a camera coupled to the processor, and wherein, to perform the device discovery procedure, the processor is further configured to:
obtain, using the camera, an image of at least a portion of the environment; and
identify the target device in the environment using the image.

19. The environment infrastructure system of claim 18, wherein, to identify the target device in the environment using the image, the processor is further configured to identify a perceivable informative marker attached to the target device.

20. The environment infrastructure system of claim 15, wherein, to perform the device discovery procedure, the processor is further configured to:
scan the environment using a light beam from the power providing component; and
receive a communication from the target device when the light beam interacts with a power harvesting component of the target device.

21. The environment infrastructure system of claim 15, wherein the power requirement information is obtained from a target device power requirement data structure by the power providing component.

22. The environment infrastructure system of claim 15, wherein the power requirement information is obtained from the target device after performing the device discovery procedure.

23. The environment infrastructure system of claim 15, wherein the environment infrastructure system further comprises a camera coupled to the processor and an additional light source, and wherein the processor is further configured to:
provide additional power to the target device using the additional light source.

24. The environment infrastructure system of claim 15, wherein the operation result comprises data generated by the target device using at least a portion of the power amount.

25. The environment infrastructure system of claim 15, wherein the operation result comprises a request for additional power, the processor is further configured to:
provide, based on the request for additional power, a higher amount of power to the target device from the power providing component.

26. The environment infrastructure system of claim 25, wherein the processor is further configured to:
receive a second operation result at the environment infrastructure system based on a second operation of the target devices performed using the higher amount of power.

27. The environment infrastructure system of claim 15, wherein the processor is further configured to:
determine that an interfering object enters the environment; and
pause the transmitting of the power amount based on determining that the interfering object enters the environment.

28. The environment infrastructure system of claim 15, wherein, to obtain the distance, the processor is further configured to calculate the distance.

* * * * *